(12) United States Patent
Kosaka

(10) Patent No.: US 8,605,186 B2
(45) Date of Patent: Dec. 10, 2013

(54) VIDEO FORMAT CONVERSION WITHOUT A FLICKER FOR THE SOLID IMAGING APPARATUS

(75) Inventor: Hiroki Kosaka, Kodaira (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 232 days.

(21) Appl. No.: 13/044,141

(22) Filed: Mar. 9, 2011

(65) Prior Publication Data

US 2011/0261243 A1 Oct. 27, 2011

(30) Foreign Application Priority Data

Apr. 26, 2010 (JP) ................................ 2010-100916

(51) Int. Cl.
*H04N 3/14* (2006.01)
*H04N 5/335* (2011.01)

(52) U.S. Cl.
USPC ........................................ 348/312; 348/317

(58) Field of Classification Search
USPC ................... 348/298, 311–312, 317–323; 250/208.1; 257/294, 432
See application file for complete search history.

(56) References Cited

U.S. PATENT DOCUMENTS

| | | | | |
|---|---|---|---|---|
| 2001/0010554 A1* | 8/2001 | Yoshida | .................. | 348/312 |
| 2005/0088535 A1* | 4/2005 | Hatano | .................. | 348/220.1 |
| 2009/0040362 A1* | 2/2009 | Glenn | .................. | 348/342 |
| 2009/0295971 A1* | 12/2009 | Tsuchiya | .................. | 348/311 |
| 2011/0075003 A1* | 3/2011 | Suzuki et al. | .................. | 348/311 |

FOREIGN PATENT DOCUMENTS

| | | |
|---|---|---|
| JP | 10-257397 | 9/1998 |
| JP | 11-098421 | 4/1999 |
| JP | 2008-206030 | 9/2008 |

OTHER PUBLICATIONS

CCD area image sensor, MW39781AE Panasonic Inc. Mar. 9, 2010.

* cited by examiner

*Primary Examiner* — Kelly L Jerabek
(74) *Attorney, Agent, or Firm* — Brundidge & Stanger, P.C.

(57) ABSTRACT

In an imaging apparatus which subjects signal electric charges of photodiodes of IT-CCD for interlaced scanning of 1080 effective scanning lines to vertical pixel addition to be read out as image signals, at least one of vertical transfer at the last horizontal period and horizontal transfer at half period in reading of pixels is stopped while fixing pairs of vertical pixels to be subjected to vertical pixel addition to be read out as image signals of progressive scanning of 540 effective scanning lines from the CCD and the read-out image signals of 540 effective scanning lines are subjected to scanning line conversion of 3 to 4 to be converted into image signals of progressive scanning of 720 effective scanning lines, the image signals of progressive scanning of 720 effective scanning lines being outputted.

6 Claims, 16 Drawing Sheets

FIG.4C (h) PROGRESSIVE SCAN IMAGE CONVERTED FROM EVEN FIELD VERTICAL PIXEL ADDITION IMAGE h1 : (2/20)*(a-2+a-1)+(2/5)*(a0+a1)+(8/20)*(a2+a3)
h2 : (3/20)*(a0+a1)+ (3/5)*(a2+a3) + (5/20)*(a4+a5)
h3: (5/20)*(a2+a3)+(3/5)*(a4+a5)+(3/20)*(a6+a7)
h4 : (5/20)*(a4+a5)+(3/5)*(a6+a7)+(3/20)*(a8+a9)
⋮
(8/20)*(a1076+a1077)
h718: (2/20)*(a1074+a1075)+(3/5)*(a1076+a1077)+(3/20)*(a1078+a1079)
h719: (3/20)*(a1076+a1077)+(4/5)*(a1078+a1079)+(5/20)*(a1080+a1081)
h720 : (5/20)*(a1078+a1079)+(3/5)*(a1080+a1081)+(3/20)*(a1082+a1083)

(d) SCANNING LINE CONVERSION (g) PROGRESSIVE SCAN IMAGE CONVERTED FROM EVEN FIELD VERTICAL PIXEL ADDITION IMAGE g1 : (3/5)*(a0+a1) + (2/5)*(a2+a3)
g2 : (4/5)*(a2+a3) + (1/5)*(a4+a5)
g3 : (1/5)*(a2+a3)+(4/5)*(a4+a5)
g4 : (2/5)*(a4+a5)+(3/5)*(a6+a7)
⋮
(2/5)*(a1076+a1077)
g718 : (4/5)*(a1076+a1077)+ (1/5)*(a1078+a1079)
g719 : (1/5)*(a1078+a1079)+(4/5)*(a1080+a1081)
g720 : (2/5)*(a1080+a1081)+(3/5)*(a1082+a1083)

(c) EVEN FIELD VERTICAL PIXEL CONVERSION IMAGE c-2 : a-2+a-1
c0 : a0+a1
c2 : a2+a3
c4 : a4+a5
c6 : a6+a7
⋮
c1076 : a1076+a1077
c1078 : a1078+a1079
c1080 : a1080+a1081
c1082 : a1082+a1083

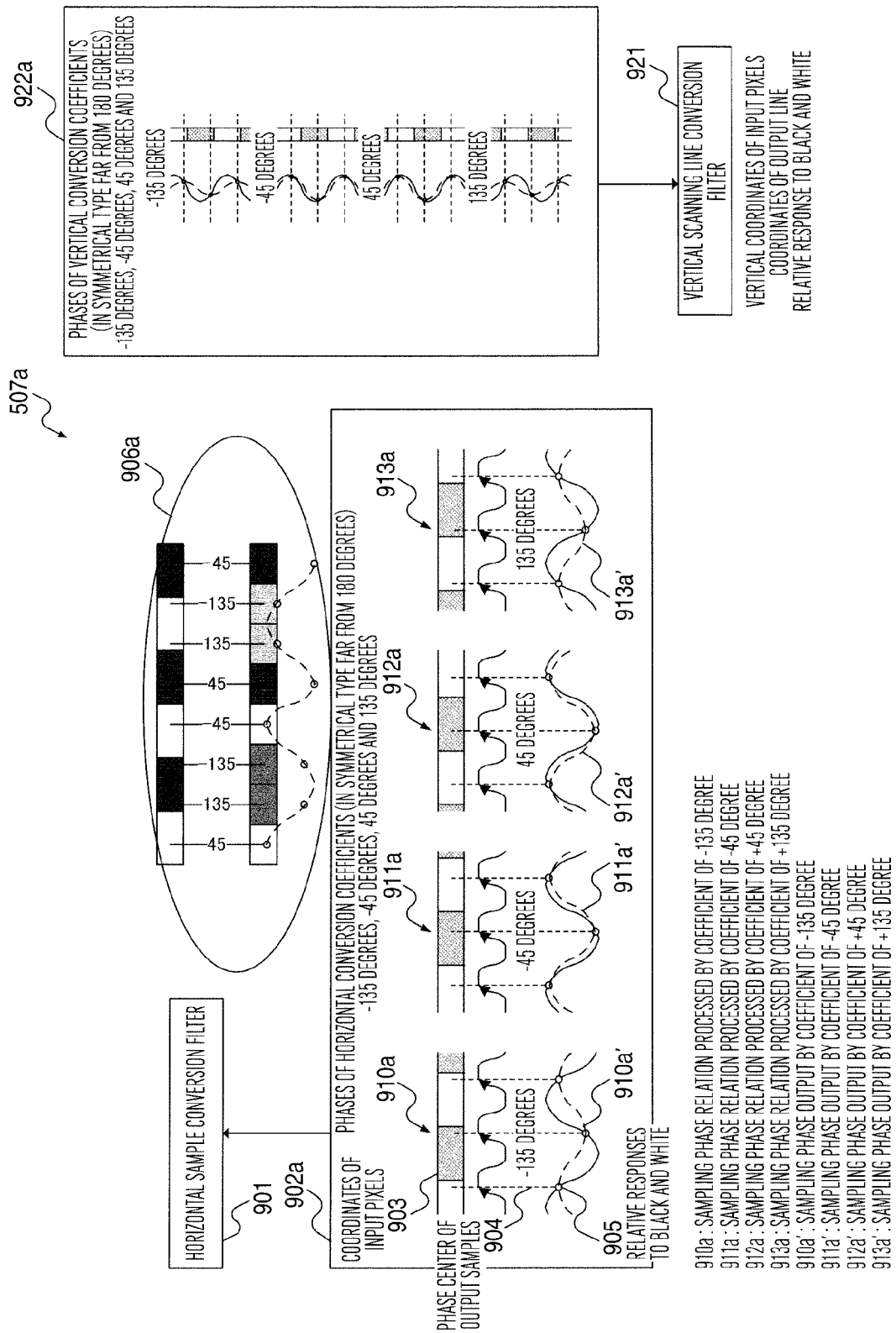

VIDEO FORMAT CONVERSION WITHOUT A FLICKER FOR THE SOLID IMAGING APPARATUS

INCORPORATION BY REFERENCE

The present application claims priority from Japanese application JP-2010-100916 filed on Apr. 26, 2010, the content of which is hereby incorporated by reference into this application.

BACKGROUND OF THE INVENTION

The present invention relates to an imaging apparatus including solid imaging devices.

In imaging devices made of silicon, an electrode voltage such as substrate voltage is varied to change the saturation characteristic of photodiodes (PD). A positive pulse voltage is applied to an overflow drain (OD) of substrate (Sub) to thereby sweep away electric charges of photodiodes. FIT-CCD (Frame Interline Transfer—Charge-Coupled Device) and IT-CCD (Interline Transfer—Charge-Coupled Device) among CCD's (Charge-Coupled Devices) have overflow drain formed by substrate and named vertical-type overflow drain (refer to CCD area image sensor, 39781AE Panasonic Inc.)

FIG. 5B is a block diagram schematically illustrating a conventional imaging apparatus 501. An imaging part 503 of FIG. 5B includes IT-CCD, a vertical transfer drive part having timing generator (TG), sweeping-away function of overflow drain (OD) and reading function, a correlated double sampling (CDS) for removing noise, a dark-current correction and automatic gain control (AGC) amplifier circuit, an analog-to-digital converter (ADC) for converting analog signal into digital image signal Vi, a timing generator (TG) for horizontal transfer, a timing generator (TG) for reset of voltage conversion, a timing generator (TG) for correlated double sampling (CDS), a timing generator (TG) for correction of dark current, a timing generator (TG) for automatic gain control (AGC), a timing generator (TG) for analog-to-digital converter (ADC) and one CCD having on-chip color filter or color separation optical system and three CCD's. Various forms of the plural timing generators are considered as the case where the plural timing generators are dispersed or divided for each of functions and the case where the plural timing generators are integrated into one timing generator, although objects to be timing controlled are as described above and timing pulses thereof are divided into pulses repeated at horizontal period and at vertical period. Part or all of the functions described above are sometimes integrated to use an integrated circuit (IC) named AFE (Analog Front End), although there is no difference in realized functions. Incident light focused by a lens 502 becomes image signal in the imaging part 503 and the image signal is processed by an image signal processing part 505 having scanning line number conversion function and chromatic magnification aberration correction function. The imaging part 503 and the image signal processing part 505 are controlled by CPU (Central Processing Unit) 504 (refer to JP-A-2008-206030).

The imaging part 503 includes timing generator (TG) 506. FIG. 8B is a block diagram schematically illustrating an example of the timing generator contained in the imaging part of the conventional imaging apparatus.

A clock counter 801 counts clocks for performing horizontal input sampling to output a horizontal count value. A comparator 802 compares a maximum value of horizontal input sampling with the horizontal count value and when the maximum value is coincident with the horizontal count value, the comparator 802 outputs horizontal reset and vertical count-up signal. The clock counter 801 is reset by the horizontal reset and vertical count-up signal of the comparator 802 to repeat counting of horizontal periods.

A line counter 803 counts up clocks having horizontal reset and vertical count-up signal to output a vertical count value. A comparator 804 compares a maximum value in vertical line with the vertical count value and when both values are coincident with each other, the comparator outputs vertical maximum line flag signal. An AND circuit 805 calculates AND or logical product of the vertical maximum line flag signal and the horizontal reset and vertical count-up signal and outputs a vertical reset signal. The line counter 803 is reset by the vertical reset signal of the AND circuit 805 and repeats counting of vertical periods.

A horizontal pulse production circuit 806 produces various horizontal pulses required by CCD in accordance with the horizontal count value. The horizontal pulses correspond to pulses repeated at horizontal period such as horizontal transfer pulse, voltage conversion reset pulse, CDS pulse, dark-current correction clamping pulse, AGC part clamping pulse and ADC horizontal synchronization pulse.

A vertical pulse production circuit 807 produces vertical pulses required by CCD in accordance with the vertical and horizontal count values. The vertical pulses correspond to pulses repeated at vertical period and having horizontal pulse displacement phase such as OD sweeping-away pulse, reading pulse and vertical transfer pulse.

The image signal processing part 505 includes a conversion filter 507 for processing scanning line number conversion and the like. The conversion filter requires repetition of conversion coefficient at each sampling for converting sampling points in horizontal and vertical directions in accordance with relative phase relation of input and output and has a plurality of conversion coefficients. FIG. 9B schematically illustrates the concept of the conversion coefficients based on 0-degree phase contained in the image signal processing part of the conventional imaging apparatus.

A horizontal sample conversion filter 901 is an FIR (Finite Impulse Response) filter which can change conversion coefficient for each clock and multiply conversion coefficient values corresponding to coordinates thereof for a plurality of input pixels within a fixed range and add up them to thereby produce pixel information corresponding to phase center of output sample.

Phase 902 of horizontal conversion coefficient gives conversion coefficient used in filter calculation to the horizontal sample conversion filter 901. The phase 902 of horizontal conversion coefficient contains a plurality of sets of conversion coefficients and gives the sets of conversion coefficients for phase according to value of registration correction set by CPU 504 to the horizontal sample conversion filter 901. Example of contents of numerical values of conversion coefficients is described separately, although kinds of phases provided as the sets of conversion coefficients concerning a point of view of this method are described here.

The plurality of sets of conversion coefficients contained in the phase 902 of horizontal conversion coefficient are schematically illustrated in combination of coordinates 903 of input pixels, phase centers 904 of output samples and relative responses 905 to black and white in unit of input pixels. First, the phase 902 of horizontal conversion coefficient has a set 910 of conversion coefficients of 0-degree phase in which the coordinates 903 of input pixels and the phase center 904 of output sample are coincident. In addition, there are provided the sets of conversion coefficients having different phase centers 904 of output sample and coordinates 903 of input pixels used for registration correction and sampling (scanning line in vertical direction) conversion, although the sets of conversion coefficients are provided as phase appearing successively from 0-degree phase when the phase of input and output is changed in sampling (scanning line in vertical direction) conversion. Here, conversion of input/output of 3 to 4 which is utilized with high frequency and is easy to be explained is taken as an example such as the case where 960 pixels are converted into 1280 pixels and the case where 1440 pixels are converted into 1920 pixels. 4 kinds of phases are required every 90 degrees from 0-degree phase and accordingly there are provided a set 911 of conversion coefficients of 90-degree phase, a set 912 of conversion coefficients of 180-degree phase and a set 913 of conversion coefficients of 270-degree phase.

A correlation diagram 906 of conversion of input/output of 3 to 4 in the horizontal sample conversion filter 901 shows that the sets of conversion coefficients contained in the phase 902 of horizontal conversion coefficient can be converted repeatedly for four kinds every output clock. 0-degree phase that amplitude of relative response to black and white is maximum and 180-degree phase that amplitude does not exist at all and is smoothed exist together in the repeated conversion. Accordingly, moiré (flicker and jitter in vertical direction) or the like is liable to be caused to degrade the image quality and the conversion characteristic of filter is required to be approximated to 180-degree phase having the least amplitude in order to approximate the conversion characteristic of filter for improvement of the above defects, so that the merit of the 0-degree phase having maximum amplitude cannot be utilized effectively to reduce the resolution.

A vertical scanning line conversion filter 921 is an FIR filter which can change conversion coefficient for each scanning line and multiply conversion coefficient values corresponding to coordinates thereof for a plurality of input pixels within a fixed range and add up them to thereby produce pixel information corresponding to phase center of output scanning lines.

Phase 922 of vertical conversion coefficient gives conversion coefficient used in filter calculation to the vertical scanning line conversion filter 921. The phase 922 of vertical conversion coefficient contains a plurality of sets of conversion coefficients and gives the sets of conversion coefficients for phase according to value of registration correction set by CPU 504 to the vertical scanning line conversion filter 921. This portion is different in that directivity is horizontal or vertical and coefficient is changed over every clock or every scanning line and accordingly detailed description thereof is omitted.

Filter coefficient is reversed every field in interlacing and 0-degree phase and 180-degree phase appear in the same space coordinates alternately, so that moiré causes flicker and jitter at edge.

SUMMARY OF THE INVENTION

It is an object of the present invention is to output image subjected to scanning line conversion so that there is less jitter than conventional scanning line conversion.

In order to solve the above problems, according to the present invention, an imaging apparatus which subjects signal electric charges of IT-CCD or FIT-CCD for interlaced scanning to vertical pixel addition to be read out as image signals performs at least one of;

a method of fixing pairs of vertical pixels subjected to vertical pixel addition, stopping transfer at half of horizontal period of the last of field, reading out as image signals of first progressive scanning from the CCD, subjecting the read-out image signals of first progressive scanning to scanning line conversion by additional average of plural scanning lines to be converted into image signals of second progressive scanning and outputting image signals of second progressive scanning;

a method of performing vertical pixel addition to be read out as image signal of third progressive scanning from the CCD, subjecting scanning line conversion to the read-out image signals of third progressive scanning by additional average of 3 or more scanning lines in natural number to be converted into image signals of second progressive scanning and outputting image signals of second progressive scanning, and a method of changing pairs of vertical pixels subjected to vertical pixel addition to odd and even fields to be read out as image signals of interlaced scanning from the CCD, rendering arrangement phase including a greater symmetric such that reducing singular points in correlation of arrangement phases of scanning lines of image signals of the interlaced scanning and arrangement phases of scanning lines of image signals of second progressive scanning, subjecting the image signals to scanning line conversion by additional average of scanning lines of several kinds of coefficients having vertical frequency characteristics approximating to one another to be converted into image signals of second progressive scanning and outputting image signals of second progressive scanning.

In an imaging apparatus which subjects signal electric charges of IT-CCD for interlaced scanning of 1080 effective scanning lines to vertical pixel addition to be read out as image signals, a solid imaging apparatus performs;

a method of fixing pairs of vertical pixels subjected to vertical pixel addition, stopping transfer at half of horizontal period of the last of field, reading out as image signals of progressive scanning of 540 effective scanning lines from the CCD, subjecting the read-out image signals for 540 effective scanning lines to scanning line conversion of 3 to 4 to be converted into image signals of progressive scanning of 720 effective scanning lines, and outputting image signals of progressive scanning of 720 effective scanning lines and a method of stopping at least one of vertical transfer at half of horizontal period of the last of field, horizontal transfer at half of horizontal period of the last of field and clamping of horizontal optical black pixels of at least one time.

In an imaging apparatus which subjects signal electric charges of IT-CCD for interlaced scanning of 1084 or more scanning lines of aperture pixels to vertical pixel addition to be read out as image signals, a solid imaging apparatus performs at least one of;

a method of changing pairs of vertical pixels subjected to vertical pixel addition to odd and even fields to be read out as image signals of progressive scanning of 542 effective scanning lines of odd field and 543 effective scanning lines of even field from the CCD, subjecting the read-out image signals of 542 effective scanning lines of odd field to scanning line conversion by additional average of 2 scanning lines to be converted into image signals of progressive scanning of 720 effective scanning lines, subjecting the read-out image signals of 543 effective scanning lines of even field to scanning line conversion by additional average of 3 scanning lines to be converted into image signals of progressive scanning of 720 effective scanning lines, and outputting image signals of progressive scanning of 720 effective scanning lines and a method of changing pairs of vertical pixels subjected to vertical pixel addition to odd and even fields to be read out as image signals of interlaced scanning from the CCD, rendering arrangement phase including a greater symmetric such that reducing singular points in correlation of arrangement phases of 1084 or more scanning lines of the read-out image signals of interlaced scanning and arrangement phases of 720 effective scanning lines of progressive scanning, performing scanning line conversion by combination of additional average of 4 scanning lines and additional average of 3 scanning lines having vertical frequency characteristic approximating to one another to be converted into image signals of progressive scanning of 720 effective scanning lines and outputting image signals of progressive scanning of 720 effective scanning lines.

According to the present invention, image subjected to scanning line conversion so that there is less jitter than conventional scanning line conversion can be outputted.

Other objects, feature and advantages of the invention will become apparent from the following description of the embodiments of the invention taken in conjunction with accompanying drawings.

BRIEF DESCRIPTION OF THE DRAWINGS

FIG. 4C is also a schematic diagram showing vertical pixel addition and scanning line conversion operation of the imaging apparatus according to another embodiment of the present invention in an even field;

FIG. 9A schematically illustrates the concept of conversion coefficients having more symmetrical phases contained in image signal processing part of the imaging apparatus of the present invention.

DESCRIPTION OF THE EMBODIMENTS

Figure 5A:
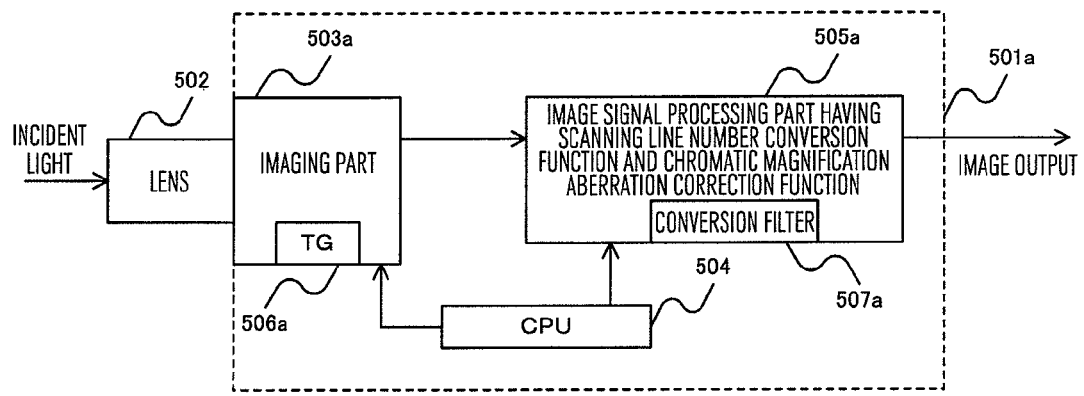
FIG. 5A is a block diagram schematically illustrating an imaging apparatus of the present invention.

FIG. 5A is a block diagram illustrating structure of an imaging apparatus 501a according to the present invention. An imaging part 503a of FIG. 5A includes IT-CCD, a vertical transfer drive part having timing generator (TG), sweeping-away function of overflow drain (OD) and reading function, a correlated double sampling (CDS) for removing noise, a dark-current correction and automatic gain control (AGC) amplifier circuit, an analog-to-digital converter (ADC) for converting analog signal into digital image signal Vi, a timing generator (TG) for horizontal transfer, a timing generator (TG) for reset of voltage conversion, a timing generator (TG) for correlated double sampling (CDS), a timing generator (TG) for correction of dark current, a timing generator (TG) for automatic gain control (AGC), a timing generator (TG) for analog-to-digital converter (ADC) and one CCD having on-chip color filter or color separation optical system and three CCD's. Various forms of the plural timing generators (TG's) are considered as the case where the plural timing generators are dispersed or divided in each of functions and the case where the plural timing generators are integrated into one timing generator, although objects to be timing controlled are as described above and timing pulses thereof are divided into pulses repeated at horizontal period and pulses repeated at vertical period. Part or all of the functions described above are sometimes integrated to use an integrated circuit (IC) named AFE (Analog Front End), although there is no difference in realized functions. Incident light focused by a lens 502 becomes image signal in the imaging part 503a and the image signal is processed by an image signal processing part 505a having scanning line number conversion function and chromatic magnification aberration correction function to be outputted. The imaging part 503a and the image signal processing part 505a are controlled by CPU (Central Processing Unit) 504 (refer to JP-A-2008-206030).

Figure 8A:
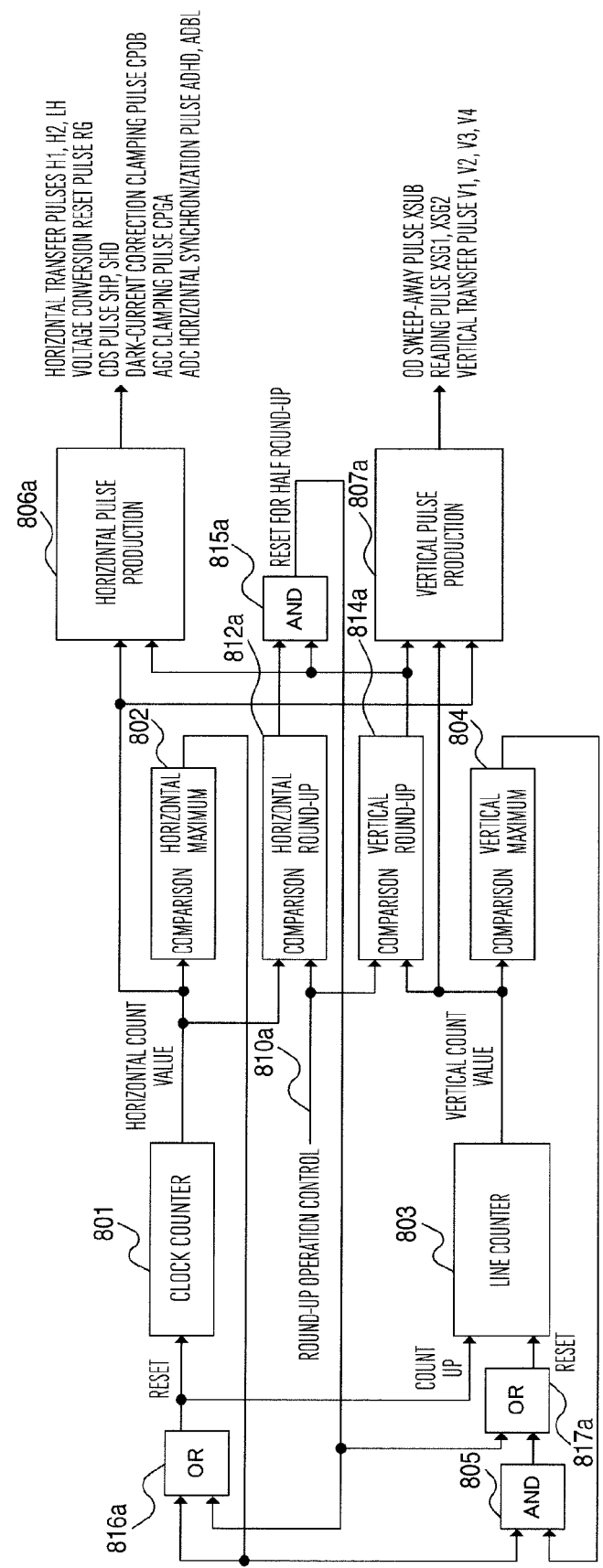
FIG. 8A is a block diagram of TG included in an imaging part of the imaging apparatus of the present invention.
Figure 8B:
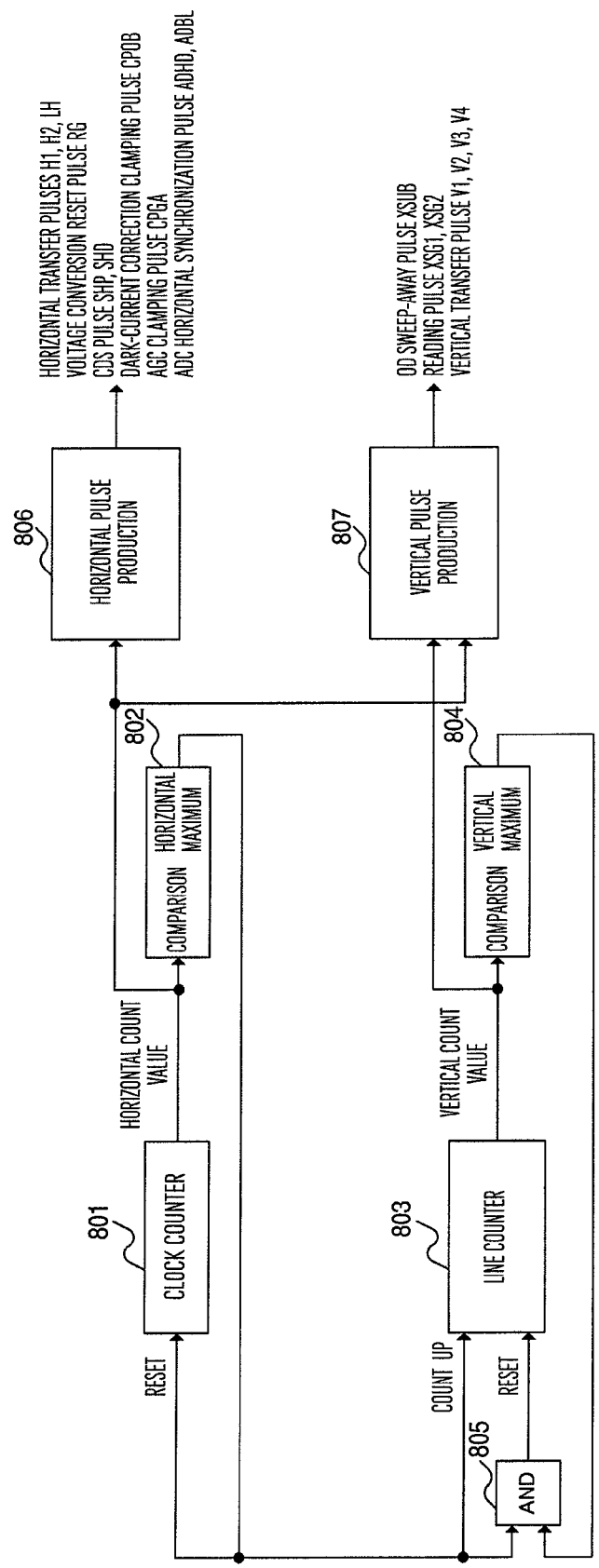
FIG. 8B is a block diagram of TG included in an imaging part of a conventional imaging apparatus.

The imaging part 503a includes timing generator (TG) 506a. FIG. 8A is a block diagram schematically illustrating an example of the timing generator contained in the imaging part of the imaging apparatus according to the present invention.

A clock counter 801 counts clocks for performing horizontal input sampling to output a horizontal count value. A comparator 802 compares a maximum value of horizontal input sampling with the horizontal count value and when the maximum value is coincident with the horizontal count value, the comparator 802 outputs horizontal reset and vertical count-up signal.

When round-up operation control signal 810a is set to be effective by CPU 504, comparison judgment function of comparators 812a and 814a becomes effective. The comparator 812a compares horizontal round-up phase with horizontal count value and when both of them are coincident with each other, the comparator 812a outputs reset for horizontal round-up, although the reset is usually deleted by AND circuit 815a. Only when operation changeover signal for half round-up is outputted from comparator 814a, output of comparator 812a can pass through AND circuit 815a and AND circuit 815a outputs reset for half round-up.

Clock counter 801 is reset by output of OR circuit 816a when comparator 802 outputs horizontal reset and vertical count-up signal or when AND circuit 815a outputs reset for half round-up and clock counter 801 repeats counting of horizontal periods. Only when clock counter 801 is reset by reset for half round-up of AND circuit 815a, clock counter 801 counts horizontal half-period and excepting it, clock counter 801 counts horizontal periods.

Line counter 803 counts up clocks having horizontal reset and vertical count-up signal produced by OR circuit 816a and outputs vertical count value. Comparator 804 compares the maximum value of vertical line with vertical count value and when both of them are coincident with each other, the comparator 804 outputs vertical maximum line flag signal. AND circuit 805 calculates AND or logical product of vertical maximum line flag signal and horizontal reset and vertical count-up signal and outputs a vertical reset signal. The vertical reset signal of AND circuit 805 passes through OR circuit 817a effectively. Line counter 803 is reset by vertical reset signal of AND circuit 805 to thereby repeat counting of vertical periods.

When round-up operation control signal 810a is effective, comparator 814a compares vertical round-up line with vertical count value. When the vertical round-up line is coincident with the vertical count value, comparator outputs operation changeover signal for half round-up. The condition that reset for half round-up can be produced from the AND circuit 815a is given at clock phase that reset for horizontal round-up is outputted from the comparator 812a. When reset for half round-up is outputted from AND circuit 815a, the reset for half round-up passes through OR circuit 817a effectively and line counter 803 is reset by the reset for half round-up to repeat counting vertical half periods. When round-up operation control signal 810a is effective, vertical maximum line flag signal of the comparator 804 is not outputted.

Horizontal pulse production circuit 806a produces various horizontal pulses required by CCD in accordance with horizontal count value. Horizontal pulses correspond to pulses repeated at horizontal period such as horizontal transfer pulse, voltage conversion reset pulse, CDS pulse, dark-current correction clamping pulse, AGC part clamping pulse and ADC horizontal synchronous pulse.

For pulse required to be changed for half round-up, phase comparison and gate circuit are provided in horizontal pulse production circuit 806a so that pulse to be produced is changed over by half round-up operation changeover signal from comparator 814a.

Vertical pulse production circuit 807a produces vertical pulse required by CCD in accordance with vertical count value and horizontal count value. Vertical pulses corresponds to pulses repeated at vertical period and having horizontal pulse change phase such as OD sweeping-away pulse, reading pulse and vertical transfer pulse.

For pulse required to be changed for half round-up, phase comparison and gate circuit are provided in vertical pulse production circuit 807a so that pulse to be produced is changed over by half round-up operation changeover signal from comparator 814a.

The timing generator included in the imaging part of the imaging apparatus of the present invention is characterized in that half round-up reset which can add reset at predetermined round-up position is connected to clock counter 801 and line counter 803, control as to whether round-up operation function is effective or invalid is performed by round-up operation control signal 810a, and horizontal pulse production circuit 806a and vertical pulse production circuit 807a change over operation to half round-up pulse output operation using half round-up operation changeover signal outputted by comparator 814a as gate signal.

The image signal processing part 505a includes a conversion filter 507a for processing scanning line number conversion and the like. The conversion filter requires repetition of conversion coefficient at each sampling for converting sampling points in horizontal and vertical directions in accordance with relative phase relation of input and output sampling and has a plurality of conversion coefficients. FIG. 9A schematically illustrates the concept of the conversion coefficients having more symmetrical phases contained in image signal processing part of the imaging apparatus of the present invention.

Horizontal sample conversion filter 901 is FIR filter which can change conversion coefficient for each clock and multiply a plurality of input pixels within a fixed range by conversion coefficient values corresponding to coordinates thereof and add up them, to thereby produce pixel information corresponding to phase center of output sample.

Phase 902a of horizontal conversion coefficient gives conversion coefficient used in filter calculation to the horizontal sample conversion filter 901. The phase 902a of horizontal conversion coefficient contains a plurality of sets of conversion coefficients and gives the sets of conversion coefficients for phase according to value of registration correction set by CPU 504 to the horizontal sample conversion filter 901. Example of contents of numerical values of conversion coefficients is described separately, although kind of phase provided as the sets of conversion coefficients concerning a point of view of this method is described here.

The plurality of sets of conversion coefficients provided in the horizontal conversion coefficient phase 902a are schematically illustrated in combination of coordinates 903 of input pixels, phase centers 904 of output samples and relative responses 905 to black and white in unit of input pixels.

For the plurality of sets of conversion coefficients provided in the horizontal conversion coefficient phase 902a, the sets of conversion coefficients having different input pixel coordinates 903 and output sample phase centers 904 used in registration correction and sampling (scanning line in vertical direction) conversion are provided so that as many the sets of conversion coefficients as possible are provided symmetrically in right and left direction (symmetrically in up and down directions) in respect to 0-degree phase in which input pixel coordinates 903 and output sample phase center 904 are coincident with each other. Here, conversion of input/output of 3 to 4 which is utilized with high frequency and is easy to be explained is taken as an example such as the case where 540 effective scanning lines are converted into 720 effective scanning lines and the like. The sets of conversion coefficients require 4 kinds of phases every 90 degrees from 45-degree phase as phases appearing successively when phase of input/output is changed in sampling (scanning line in vertical direction) conversion.

Figure 9B:
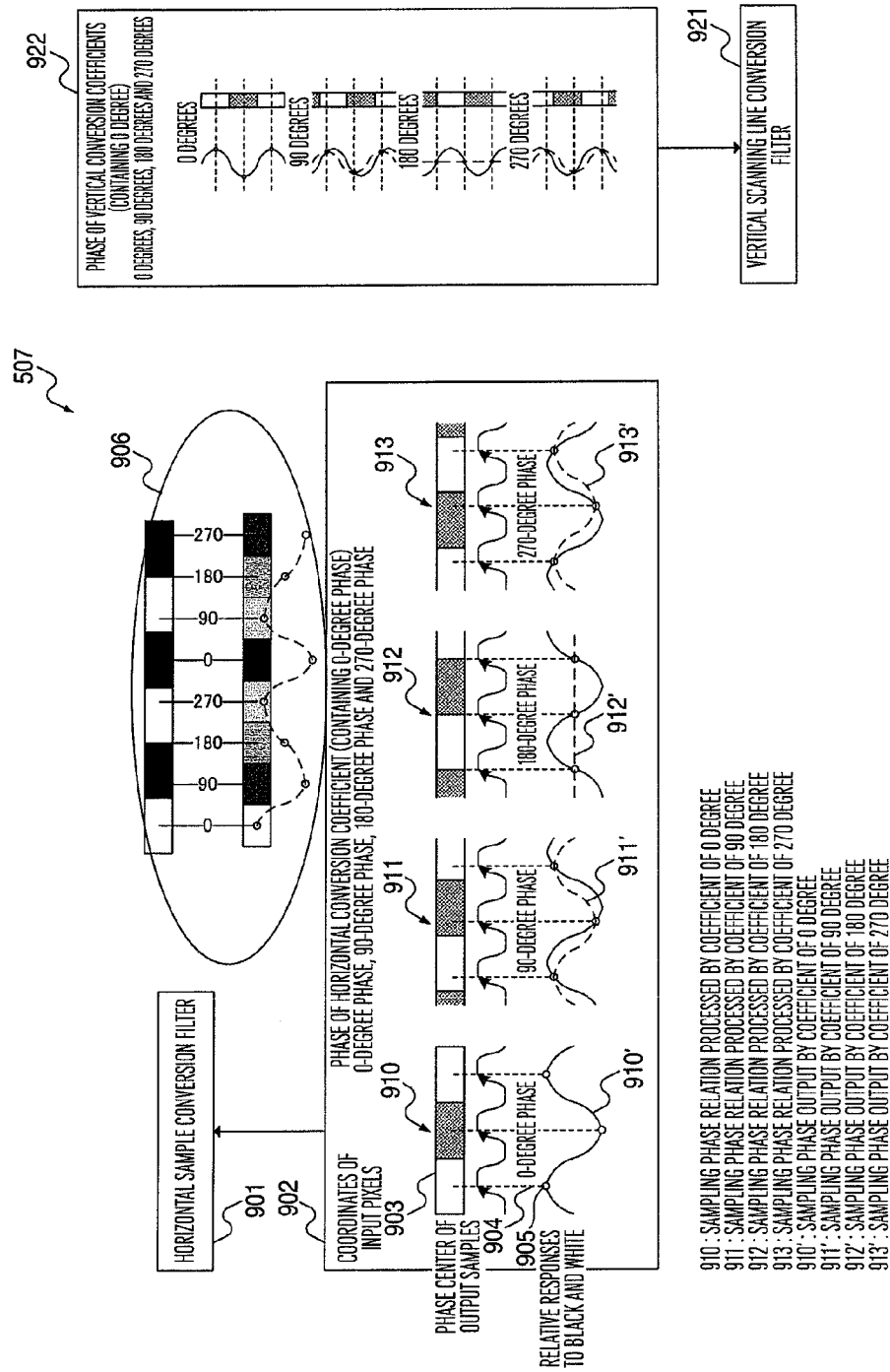
FIG. 9B schematically illustrates the concept of conversion coefficients based on 0-degree phase contained in image signal processing part of a conventional imaging apparatus.

Set 911a of conversion coefficients of −45-degree phase is symmetrical in right and left direction with set 912a of conversion coefficients of 45-degree phase and set 910a of conversion coefficients of −135-degree phase is symmetrical in right and left direction with set 913a of conversion coefficients of 135-degree phase. In FIG. 9B showing the example in the prior art, it can be confirmed that set 911 of conversion coefficients of 90-degree phase is symmetrical in right and left direction with set 913 of conversion coefficients of 270-degree phase but set 910 of conversion coefficients of 0-degree phase is different from set 912 of conversion coefficients of 180-degree phase.

When a plurality of sets of conversion coefficients are even, as many the sets of conversion coefficients as possible are provided to be symmetrical in right and left direction (symmetrical in up and down directions) to thereby remove 0-degree phase and 180-degree phase naturally. Accordingly, the set of conversion coefficients causing moiré extremely can be avoided.

When a plurality of sets of conversion coefficients are odd, as many the sets of conversion coefficients as possible are provided to be symmetrical in right and left direction (symmetrical in up and down directions) and 0-degree phase is set to be contained in singular point having no symmetry to thereby remove 180-degree phase naturally. Accordingly, the set of conversion coefficients in which amplitude is not contained in relative response to black and white at all and is smoothed can be avoided.

A correlation diagram 906a of conversion of input/output of 3 to 4 in the horizontal sample conversion filter 901 shows that the sets of conversion coefficients having the phase 902a of horizontal conversion coefficient can be converted repeatedly for four kinds every output clock. Since a lot of sets having similar figures which are symmetrical in right and left direction exist in this repetition, amplitude of relative response to black and white can be liable to be approximated and moiré can be suppressed extremely.

Vertical scanning line conversion filter 921a is FIR filter which can change conversion coefficient for each scanning line and multiply plural input pixels within a fixed range by conversion coefficient values corresponding to coordinates thereof and add up them to thereby produce pixel information corresponding to phase center of output scanning lines.

Phase 922a of vertical conversion coefficient gives conversion coefficient used in filter calculation to vertical scanning line conversion filter 921a. The phase 922a of vertical conversion coefficient contains a plurality of sets of conversion coefficients and gives the sets of conversion coefficients for phase according to value of registration correction set by CPU 504 to the vertical scanning line conversion filter 921. This portion is different in that directivity is horizontal or vertical and coefficient is changed over every clock or every scanning line. Accordingly, its detailed description is omitted.

Flicker and jitter at edge caused by reversing filter coefficient every field in interlacing can be suppressed extremely since original moiré can be reduced.

That is, by reducing singular point at which pair of conversion coefficient becomes asymmetric and outputting scanning line converted image without jitter.

Embodiment 1

Figure 1A:
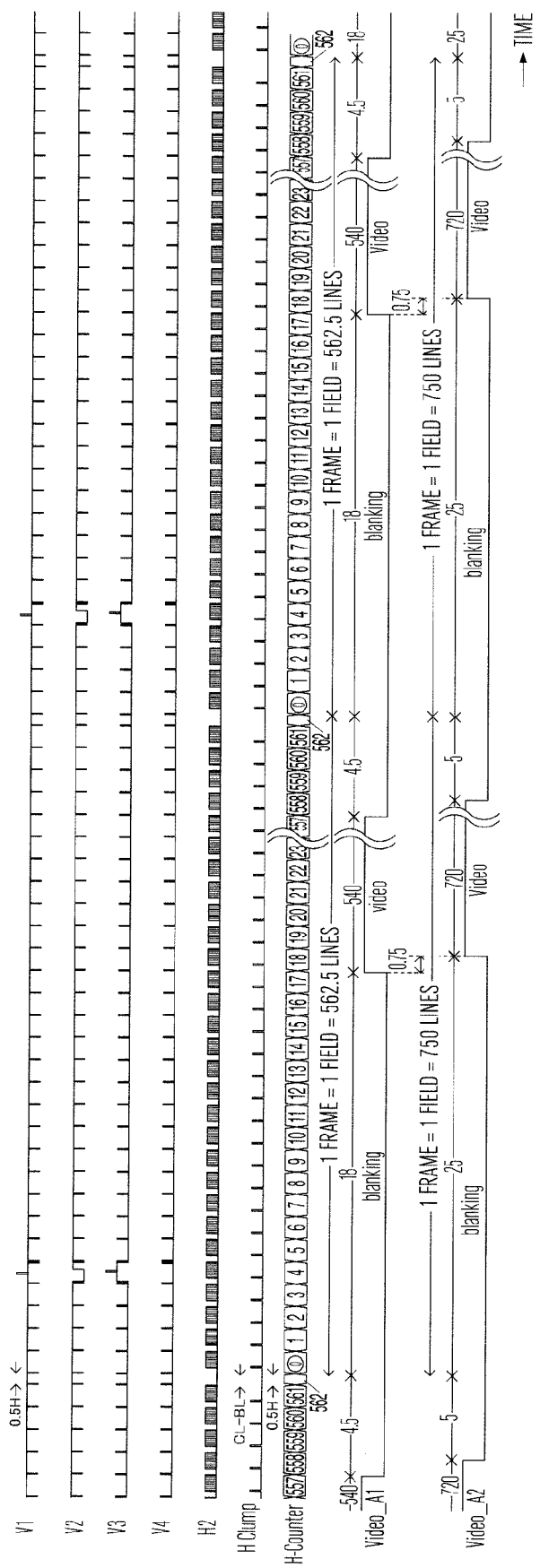
FIG. 1A is a timing chart showing operation of an imaging apparatus according to an embodiment of the present invention.
Figure 2:
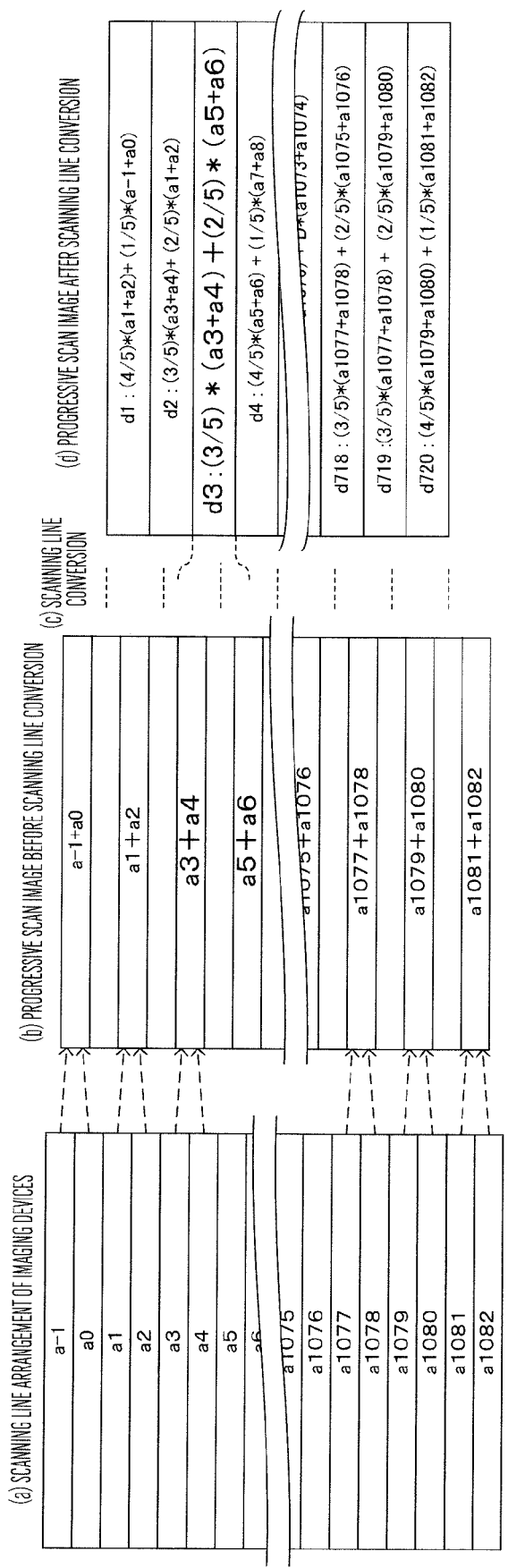
FIG. 2 is a schematic diagram showing vertical pixel addition and scanning line conversion operation of the imaging apparatus according to an embodiment of the present invention.

Referring now to FIG. 1A of a timing chart showing operation an imaging apparatus according to an embodiment of the present invention and FIG. 2 showing a schematic diagram illustrating vertical pixel addition operation of the imaging apparatus of the embodiment of the present invention, the embodiment of the present invention is described.

Figure 1B:
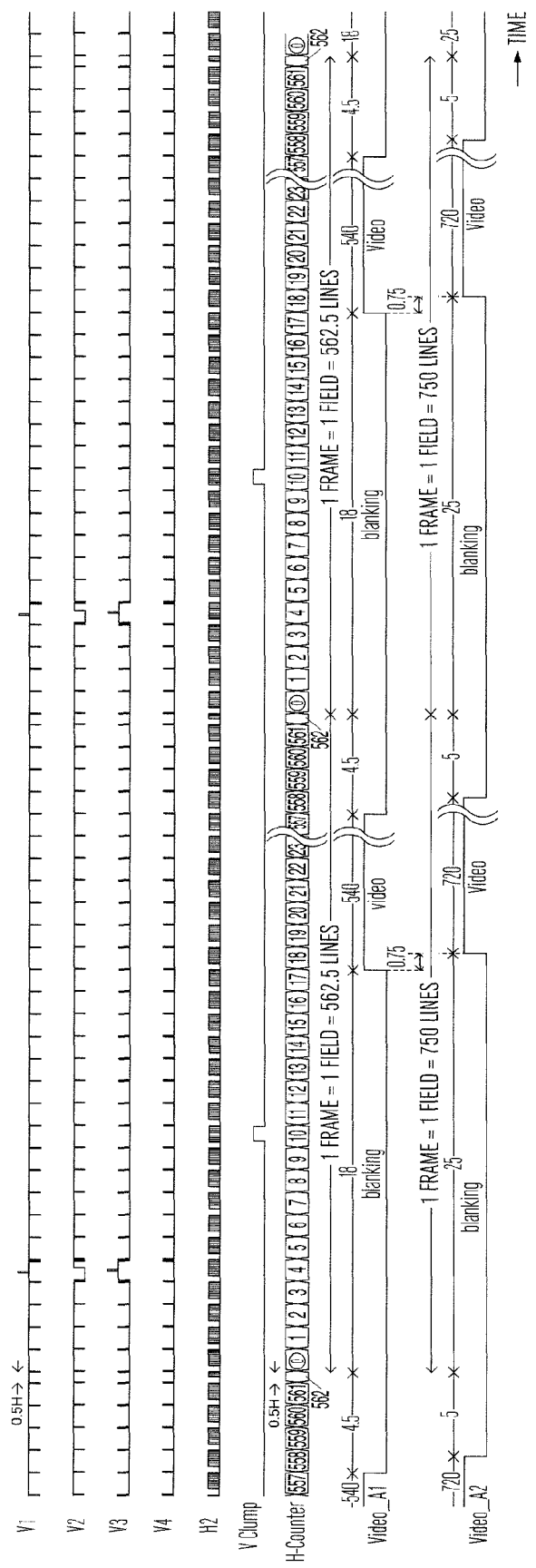
FIG. 1B is a timing chart showing operation of an imaging apparatus according to another embodiment of the present invention.

Referring together to FIG. 1B of a timing chart showing operation of an imaging apparatus according to another embodiment of the present invention, difference of measures different from FIG. 1A is described.

In FIG. 1A of the timing chart showing operation of the imaging apparatus according to the embodiment of the present invention, V1-V4 represent operation of reading vertical transfer of vertical transfer paths V1 to V4 in IT-CCD. Concretely, V1 to V4 represent reading of electric charges from PD to V1 and V3, vertical pixel addition using V2 and vertical transfer operation for a set of V1 to V4. In the embodiment, description is made by taking vertical pixel addition of odd field images as an example and accordingly only vertical pixel addition of odd field images is shown in FIG. 1A. Alternatively, if all vertical pixel addition is the same type, vertical pixel addition of even field images which performs vertical pixel addition by V4 instead of V2 can be also used for configuration and vertical pixel addition of odd field images does not exist in the timing. Odd and even field images are unified to any one of odd or even field images and the same vertical pixel addition is performed every time.

0.5 H is horizontal half-period term and exists once every field in FIG. 1A. Similarly, in FIG. 1B, 0.5 H is horizontal half-period term and exists once every field.

In FIG. 1A, H2 represents operation of horizontal transfer path H1-H2 in IT-CCD and shows timing that horizontal transfer operation having a pair of H1 having opposite polarity to H2 of FIG. 1A and H2 of FIG. 1A is performed.

In FIG. 1A, 0.5 H is also horizontal half-period transfer stop term and exists once every field in FIG. 1A.

In FIG. 1B, 0.5 H represents horizontal half-period transfer round-up term.

In FIG. 1A, H Clump represents pulses for clamping image signal by dark current of horizontal optical black pixels (H-OB) of IT-CCD to be set as reference for black.

In FIG. 1A, CL-BL represents term in which image signal by dark current of H-OB is not clamped.

In FIG. 1B, V Clump represents pulses for clamping image signal by dark current of vertical optical black pixels (V-OB) of IT-CCD to be set as reference for black. In case of system which can hold black reference of vertical optical black pixels every field, V Clump of FIG. 1B may be used instead of CL-BL of FIG. 1A.

Since the V Clump is set to horizontal period different from 0.5 H, it is similarly set to term that image signal corresponding to CL-BL of FIG. 1A is not clamped.

In FIG. 1A, when clamping is performed in synchronism with horizontal period since transfer is stopped during horizontal half-period transfer stop term of 0.5 H, part having no optical black is processed as black in succeeding stage and abnormality of image level is caused. In order to prevent it, clamping stop term of CL-BL equal to 0.5 H is provided.

There is a possibility that H-OB of next timing of horizontal half-period transfer stop term of 0.5 H is output level different from that of another H-OB and clamping stop term of CL-BL is sometimes set to 1.5 horizontal period instead of horizontal half-period according to characteristics of imaging devices.

The primary factor considered as the possibility that output level of H-OB of next timing of horizontal half-period transfer stop term of 0.5 H is different from that of another H-OB is that vertical transfer is performed twice at horizontal half-period term of 0.5 H and usual horizontal period of next timing, so that there is a possibility that addition of optical black is performed in CCD horizontal transfer path and level is varied.

In the method of the present invention, in order to perform the same image signal processing as in prior art, it is important that concept of clamping stop term of CL-BL is used to make driving on condition that black level of image is not varied. Whether its width is horizontal half-period or horizontal 1.5 period is decided at the stage that imaging device is used to design imaging apparatus. For image signal processing that variation of black level of image of part deleted from output can be neglected, clamping stop term of CL-BL is not required.

H-Counter represents horizontal scanning line counter and is operated within TG which generates drive pulse. During operation of the method of the present invention, H-Counter is operated within the range of count value 0 to count value 562 and its count value is returned to 0 after horizontal half-period is produced by count value 562. At the time of count value 4, vertical pixel addition timing for reading and odd field image is outputted onto V1 to V4. Since vertical pixel addition timing of odd field image is prepared at count value 4 in each frame, exposure time is equal to 562.5 lines of frame period. In this example, in relation of vertical pixel addition timing of odd field image and H-Counter, H-Counter is 2 lines earlier than horizontal scanning line producing vertical pixel addition timing of odd field image by usual interlaced scanning.

In block diagram of imaging apparatus of FIG. 5A, scanning line conversion part provided in image signal processing part 505a includes conversion filter in vertical direction in many cases, although scanning line conversion part functions effectively as another use as described in JP-A-2008-206030 of background art and accordingly Video A1 of FIG. 1A shows image output timing centering on filter outputted when image output timing before scanning line conversion passes through conversion filter in vertical direction for another use. Field of one time is equivalent to frame of one time and frame of one time is composed of 562.5 lines having 18 lines of upper blanking, 540 lines of image effective scanning lines and 4.5 lines of lower blanking. Image is outputted in position 2 lines earlier than 563-line configuration of odd type field in usual interlacing operation including 20 lines of upper blanking, 540 lines of image effective scanning lines and 3 lines of lower blanking and in position 2.5 lines earlier than 562-line configuration of even type field including 20 lines of upper blanking, 540 lines of image effective scanning lines and 2 lines of lower blanking.

Figure 3:
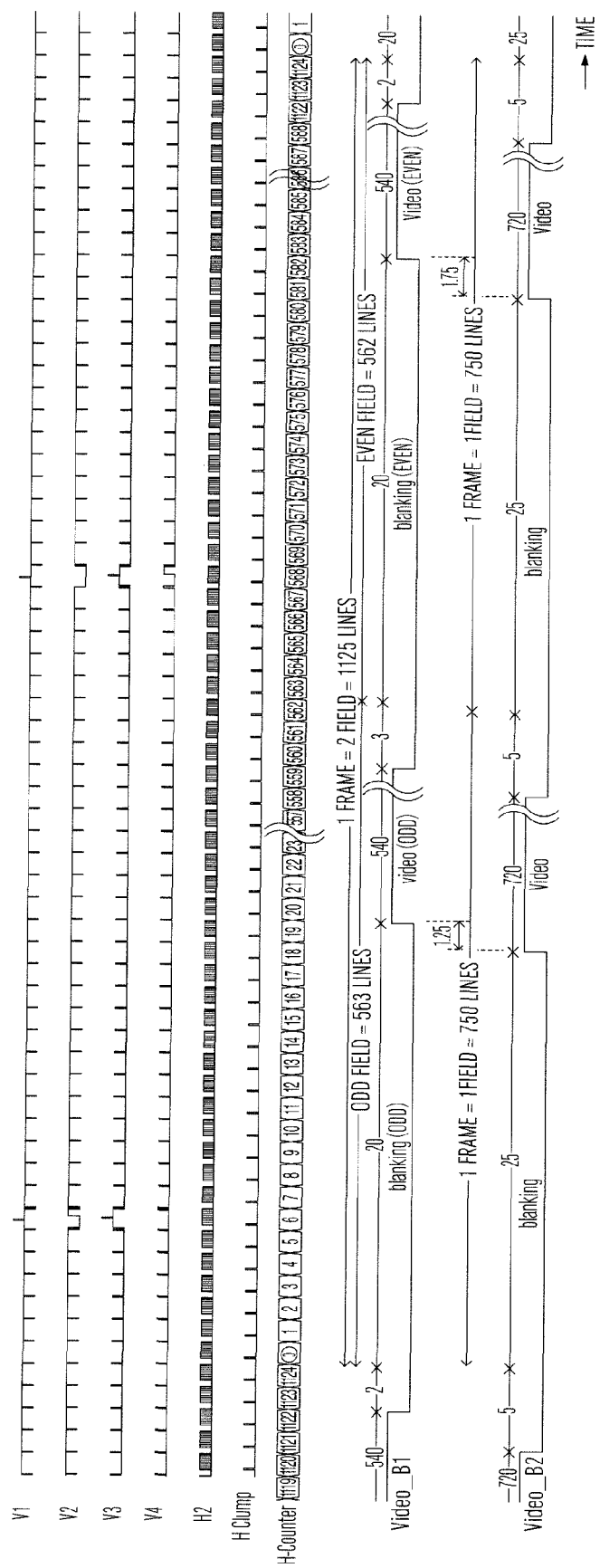
FIG. 3 is a timing chart showing operation of the imaging apparatus according to another embodiment of the present invention.

The image output timing after scanning line conversion of the Video A2 in FIG. 1A and the image output timing after scanning line conversion of the Video B2 in FIG. 3 are same image output timings. The Video B1 in FIG. 3 corresponds to the usual interlacing operation. The difference between the timing of Video A1 and the timing of the usual interlacing operation can be confirmed with comparing FIG. 1A and FIG. 3.

Video A2 of FIG. 1A is image output timing after scanning line conversion is performed. Field of one time is equivalent to frame of one time and frame of one time is composed of 25 lines of upper blanking, 720 lines of image effective scanning lines and 5 lines of lower blanking. Timing difference between Video A2 and Video A1 of FIG. 1A is 0.75 line in image effective scanning line, which is timing difference of 1 line of Video A2. Scanning line conversion is performed at the same position in each frame with shortest timing without using any frame memory.

FIG. 2 schematically illustrates vertical pixel addition operation of the imaging apparatus according to the embodiment of the present invention.

(a) of FIG. 2 represents optical positions of pixel arrangement of 1088 horizontal scanning lines of aperture pixels of ITV imaging devices. Vertical pixel range of 1084 lines from a-1 to a1082 is shown in (a) of FIG. 2. The vertical pixel range corresponding to 1084 lines is converted into progressive scan image having 542 effective scanning lines in vertical pixel addition and is further converted into progressive scan image having 720 effective scanning lines after scanning line conversion of (d) of FIG. 2 in scanning line conversion of (c) of FIG. 2.

(b) of FIG. 2 represents progressive scan image having 542 effective scanning lines in vertical pixel addition of the present invention. Since vertical pixel addition timing of odd field image is used in timing chart showing operation of the imaging apparatus of the embodiment of the present invention of FIG. 1, odd line is defined to n, which is vertical pixel added to n+1 line and progressive scan image has 542 effective scanning lines by vertical pixel addition of, for example, a3+a4.

(c) of FIG. 2 represents scanning line conversion. It corresponds to scanning line conversion part included in image signal processing part 505a in block diagram of the imaging apparatus of FIG. 5 and includes conversion filter in vertical direction. Here, simplification is made for description and conversion filter coefficients of 4/5, 3/5, 2/5 and 1/5 are switched in accordance with scanning line conversion coordinates.

(d) of FIG. 2 is progressive scan image having 720 effective scanning lines after scanning line conversion and d3 is calculated by addition of coefficients of (3/5)*(a3+a4)+(2/5)*(a5+a6). d3 is always calculated to be the same and optical position of pixel arrangement of horizontal scanning lines of same imaging devices in each frame is outputted. It represents that jitter due to difference in composition of each frame does not occur.

Embodiment 2

Another embodiment of the present invention is now described with reference to FIG. 3 of a timing chart showing operation of an imaging apparatus according to another embodiment of the present invention and FIGS. 4A, 4B, 4C of a schematic diagram illustrating vertical pixel addition operation of the imaging apparatus according to another embodiment of the present invention.

In FIG. 3 of the timing chart showing operation of the imaging apparatus according to the embodiment of the present invention, V1 to V4 represent operation of reading vertical transfer of vertical transfer paths V1 to V4 in IT-CCD. Concretely, reading of electric charges from PD to V1 and V3, vertical pixel addition of odd field image using V2 and vertical pixel addition of even field image using V4 and vertical transfer operation for a set of V1 to V4 are shown.

In FIG. 3, the periods of odd field and even field are different by 1H from each other.

In FIG. 3, H2 represents operation of horizontal transfer paths H1-H2 in IT-CCD and shows timing that horizontal transfer operation having a pair of H1 having opposite polarity to H2 of FIG. 3 and H2 of FIG. 3 is performed.

In FIG. 3, H Clump represents pulses for clamping image signal by dark current of horizontal optical black pixels (H-OB) of IT-CCD to be set as reference for black.

H-Counter represents horizontal scanning line counter, which is operated within TG for generating drive pulse. The H-Counter is operated within the range from count values 0 to 1124 while the apparatus of the present invention is operated and the H-Counter is returned to count 0 after count value 1124. Timing for reading and vertical pixel addition is outputted to be supplied to V1 to V4 at the time of count values 6 and 568. Since the timing for reading and vertical pixel addition is prepared at the time of count values 6 and 568, optical position of pixel arrangement of horizontal scanning lines for imaging devices is shifted by horizontal scanning line.

In this example, relation of timing of vertical pixel addition and H-Counter is operated in usual interlaced scanning manner. This is timing considered to be able to utilize conversion filter described next and is different from timing chart for imaging devices.

Figure 5B:
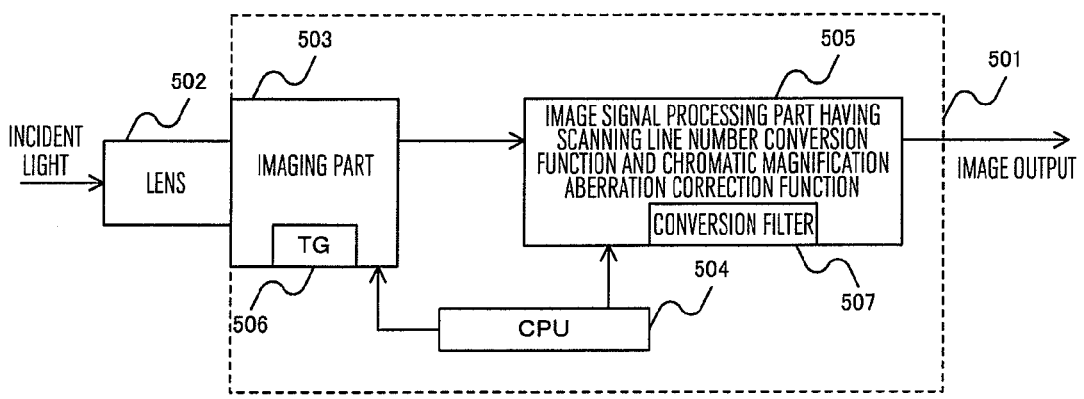
FIG. 5B is a block diagram schematically illustrating a conventional imaging apparatus.

Scanning conversion part provided in image signal processing unit 505a in block diagram of the imaging apparatus shown in FIG. 5 includes conversion filter in vertical direction in many cases, although since it functions effectively in another use as described in JP-A-2008-206030 of background art, image output timing centering on filter outputted when image output passes through conversion filter in vertical direction in another use is shown as image output timing before scanning line conversion is performed in Video B1 of FIG. 3. Odd type field includes 563 lines having 20 lines for upper blanking, 540 image effective scanning lines and 3 lines for lower blanking and even type field includes 562 lines having 20 lines for upper blanking, 540 image effective scanning lines and 2 lines for lower blanking. Frame of one time is output of usual interlaced scanning constituted by fields of two times of odd type field and even type field.

Video B2 of FIG. 3 shows image output timing after scanning line conversion. Image effective scanning line position is 1.25 lines for Video B1 and 1.66 lines for Video B2 earlier than timing of Video B2 of FIG. 3 in case of odd type field and 1.75 lines for Video B1 and 2.33 lines for Video B2 earlier than timing of Video B2 of FIG. 3 in case of even type field. In order to share Video B1 and Video B2 without using frame memory, it is necessary to reduce the number of lines utilized for conversion filter in Video B2.

Figure 4A:
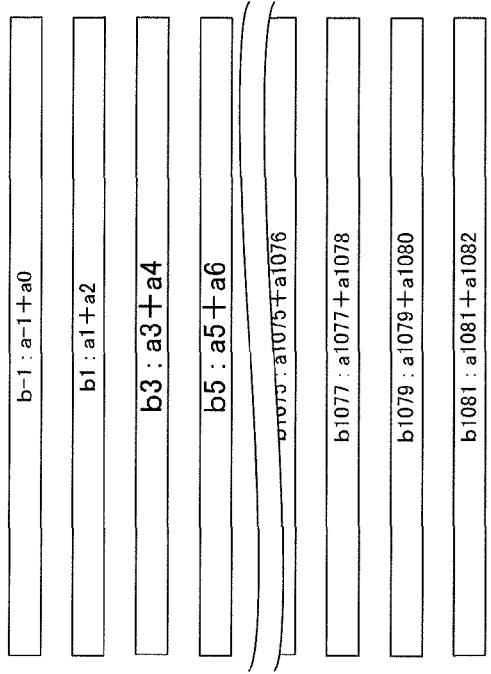
FIG. 4A is a schematic diagram showing vertical pixel addition and scanning line conversion operation of the imaging apparatus according to another embodiment of the present invention.
Figure 4A:
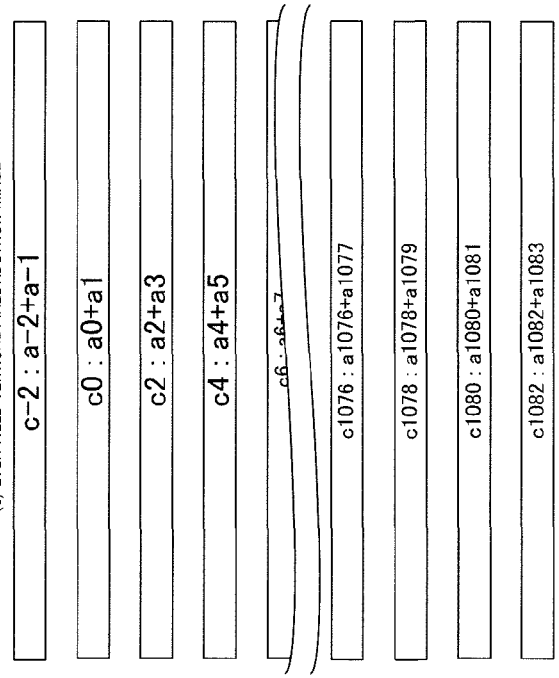
Figure 4A:
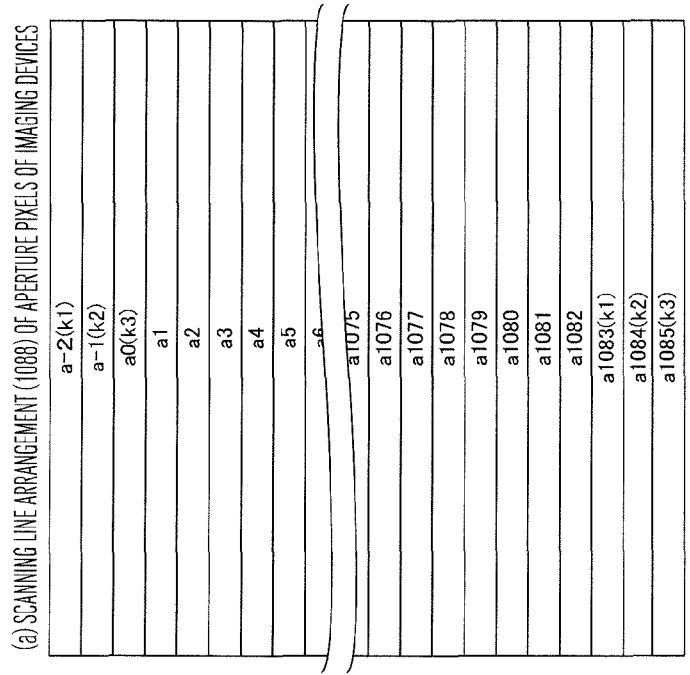
Figure 4B:
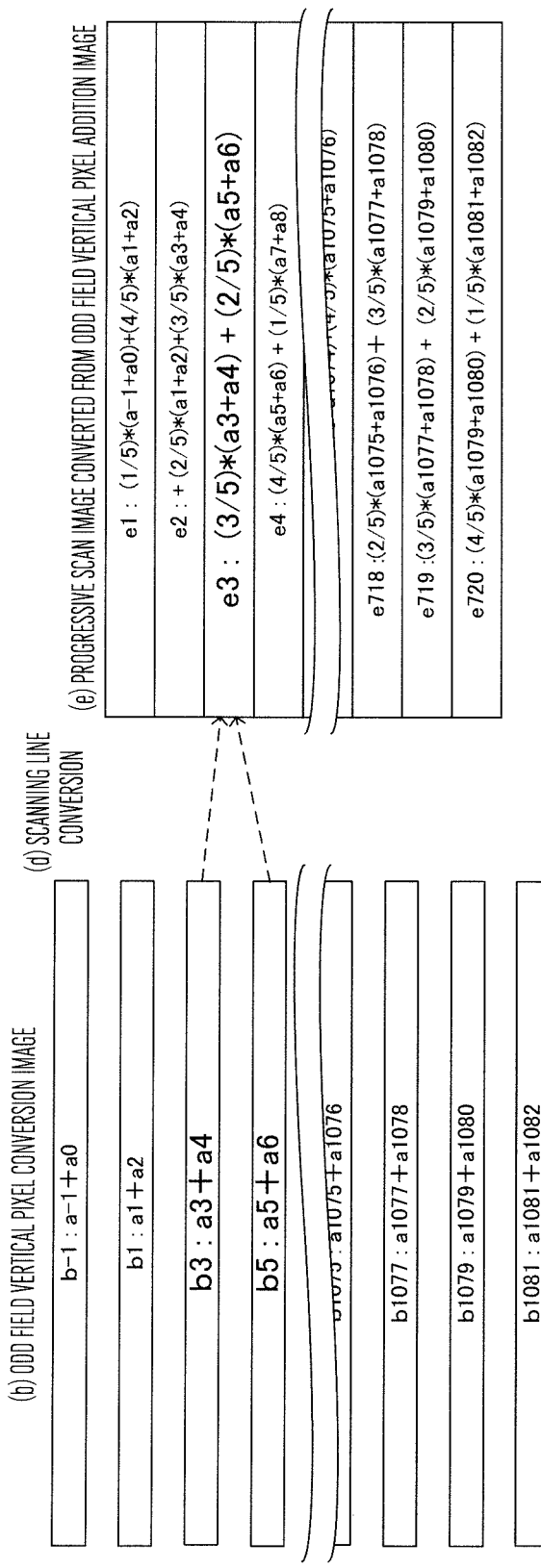
FIG. 4B is also a schematic diagram showing vertical pixel addition and scanning line conversion operation of the imaging apparatus according to another embodiment of the present invention in an odd field.

FIGS. 4A, 4B, 4C are a schematic diagrams illustrating vertical pixel addition operation of the imaging apparatus of the embodiment of the present invention.

(a) of FIG. 4A shows optical positions of pixel arrangement of horizontal scanning lines of aperture pixels of HDTV imaging devices. (a) of FIG. 4A shows vertical pixel range of aperture pixels of 1088 lines from a-2 (k1) to a1085 (k3). It is subjected to vertical pixel addition of odd field image of (b) of FIG. 4A to become scan image of 542 effective scanning lines and is then subjected to vertical pixel addition of even field image of (c) of FIG. 4A to become scan image of 543 effective scanning lines, being subjected to scanning line conversion of (d) FIG. 4B to become progressive scan image of 720 effective scanning lines after scanning line conversion as shown in (e), (g) and (h) of FIG. 4C.

Vertical pixel addition timing of odd field image is used in (b) of FIG. 4A and accordingly when odd line is n, it is added to n+1 line in vertical image addition, for example, a3+a4. Thus, progressive scan image of 542 effective scanning lines is produced by vertical image addition.

In contrast, vertical pixel addition timing of even field image is used in (c) of FIG. 4A and accordingly when even line is n, it is added to n+1 line in vertical pixel addition, for example, a2+a3. Thus, progressive scan image of 543 effective scanning lines is produced by vertical pixel addition.

(d) of FIG. 4B represents scanning line conversion. It corresponds to scanning conversion part included in image signal processing part 505a in block diagram of the imaging apparatus of FIG. 5 and includes conversion filter in vertical direction. Here, simplification is made for description and conversion filter coefficients of 4/5, 3/5, 2/5 and 1/5 are switched in accordance with scanning line conversion coordinates.

(e) of FIG. 4B, (g) and (h) of FIG. 4C show progressive scan images having 720 effective scanning lines after scanning line conversion, e3 is calculated by additional average of coefficients of $(3/5)*(a3+a4)+(2/5)*(a5+a6)$. g3 is calculated by additional average of coefficients of $(4/5)*(a4+a5)+(1/5)*(a2+a3)$ and h3 is calculated by additional average of coefficients of $(5/20)*(a2+a3)+(3/5)*(a4+a5)+(3/20)*(a6+a7)$.

(g) of FIG. 4C represents that optical position of pixel arrangement of horizontal scanning lines of imaging devices different in odd field and even field is outputted and jitter due to difference between odd field and even field occurs.

In contrast, (h) of FIG. 4C represents that optical position of pixel arrangement of horizontal scanning lines of imaging devices approximating odd field is outputted by additional average from 3 scanning lines of progressive scan image of vertical pixel addition with even field image and jitter due to difference between odd field and even field does not occur.

In the method of producing (h) of FIG. 4C, optical position of pixel arrangement of horizontal scanning lines of imaging devices can be approximated to reduce upper and lower jitter, although it is necessary that dedicated conversion filter for odd field image is added and utilization line width is widen by one line. When similar relation is found in correlation of line arrangement position before and after of scanning line conversion, filter for scanning line conversion used for odd field is used for even field by changing order in accordance with correlation of line arrangement phase, so that effects equal to or higher than (h) of FIG. 4C can be attained. Scanning line conversion utilizing effectively similar relation is described with reference to FIGS. 6A and 6B and scanning line conversion utilizing effectively only similar relation of field is described with reference to FIG. 7.

Figure 6A:
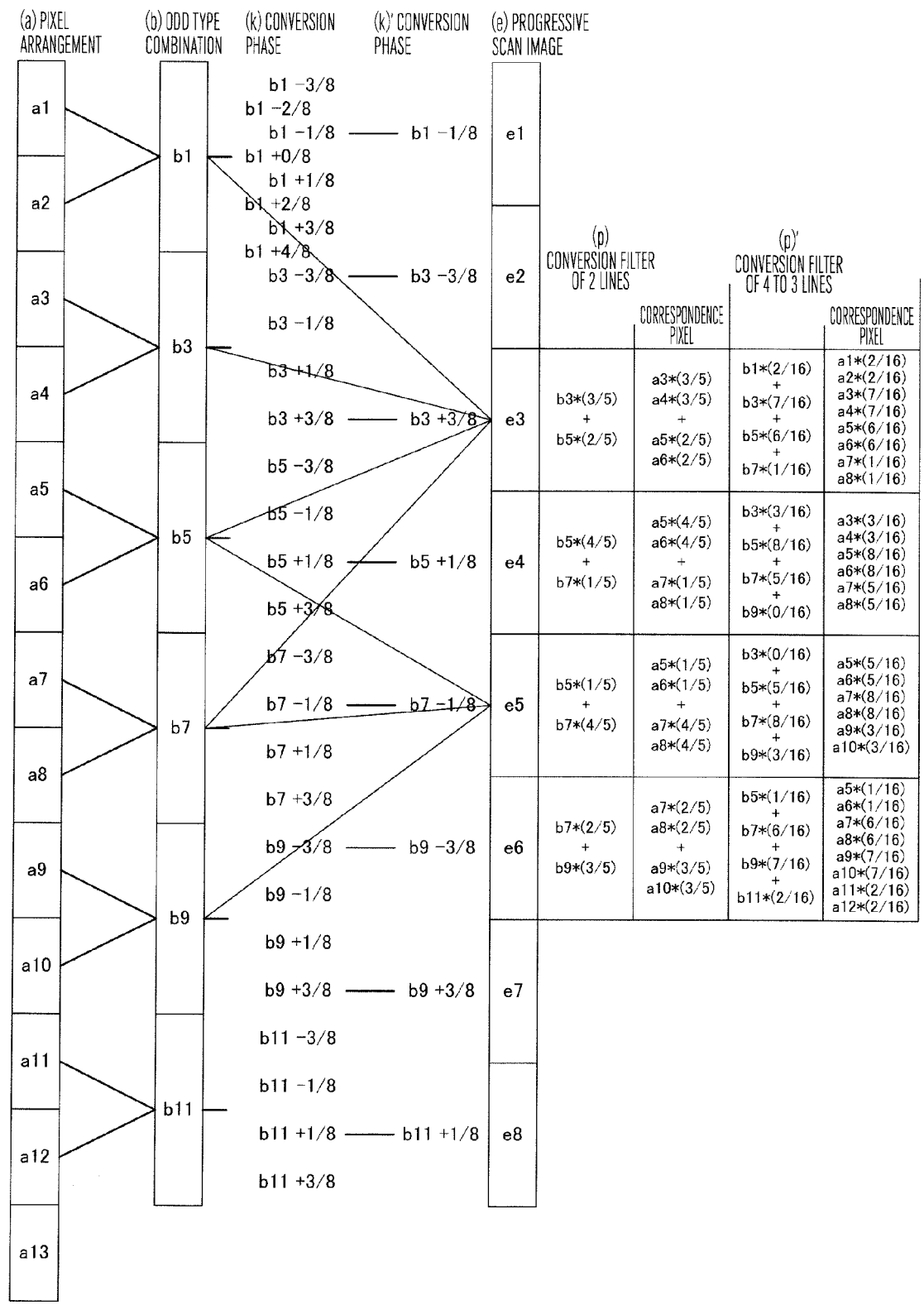
FIG. 6A is a schematic diagram showing scanning line addition operation of odd field of the imaging apparatus according to another embodiment of the present invention.
Figure 6B:
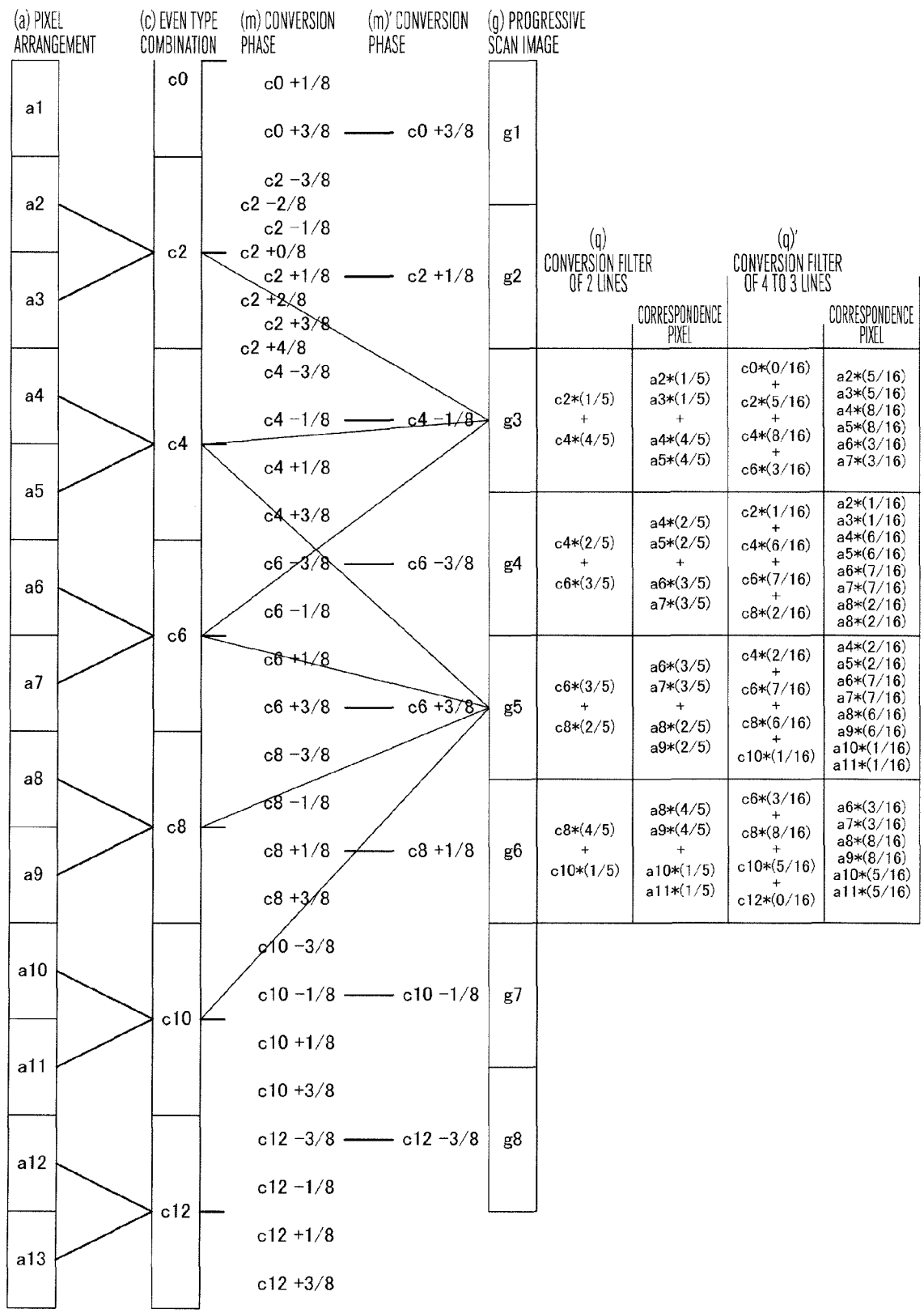
FIG. 6B is a schematic diagram showing scanning line addition operation of even field of the imaging apparatus according to another embodiment of the present invention.

FIGS. 6A and 6B are schematic diagrams illustrating vertical phase relation in vertical pixel addition operation of the imaging apparatus of the embodiment of the present invention. (a) of FIGS. 6A and 6B shows pixel arrangement of the imaging devices, which corresponds to (a) of FIG. 4A.

(b) of FIG. 6A shows scanning lines of odd field in interlaced scanning, which corresponds to (b) of FIG. 4A. n-th odd line is added to n+1st line and, for example, b3 is obtained by adding or combining a3 and a4. The vertical phase relation is described identically in vertical direction in FIG. 6A.

(c) of FIG. 6B shows scanning lines of even field in interlaced scanning, which corresponds to (c) of FIG. 4A. n-th even line is added to n+1st line and, for example, c4 is obtained by adding or combining a4 and a5. The vertical phase relation is described identically in vertical direction in FIG. 6B.

(e) of FIG. 6A shows scanning lines of progressive scan image converted from interlaced scanning of odd field and (g) of FIG. 6B shows scanning lines of progressive scan image converted from interlaced scanning of even field, which correspond to (e) of FIG. 4B and (g) of FIG. 4C, respectively. The progressive scan images shown in (e) and (g) of FIGS. 6A and 6B appear alternately and repeatedly every field of interlaced scan image before scanning line conversion and accordingly the vertical phase relation between e1 and g1 concerned with a1 in vertical direction in FIGS. 6A and 6B is described identically.

(k) of FIG. 6A shows vertical phases of scanning line conversion from odd field. An example using phases of 4 points as phases of scanning line conversion is shown. When phases are prepared at equal intervals in upper and lower direction of 1/8 phase from phase of b1+0/8 which is the center of gravity of b1, phases of 8 points are considered, although conversion filters are provided for phases of −3/8, −1/8, +1/8 and +3/8 at 4 points having odd numerator and −2/8, +0/8, +2/8 and +4/8 of phases at 4 other points are not utilized.

The reason that conversion phases at 4 points are prepared on condition that +0/8 of the center of gravity is removed forcibly is that +4/8, that is, 1/2 phase which is a middle point from two centers of gravity of lines is prevented from being contained in phase utilized at the same time and the maximum symmetry is provided in conversion filter prepared to reduce kinds thereof so that frequency characteristic of conversion filters is matched easily. The reason that 1/2 phase is prevented from being contained is described later with reference to another embodiment.

(k)' of FIG. 6A shows vertical phase of scanning line conversion from odd field which is the center of gravity of progressive scanning. −1/8, −3/8, +3/8 and +1/8 appear repeatedly as vertical phase which is the center of gravity of progressive scanning and it is shown that only 4 points exist.

(p) of FIG. 6A shows influence ratios of scanning line conversion filters using 2 lines from odd field and correspondence pixels. e3 corresponds to vertical phase of +3/8 from before scanning line conversion in (k)' of FIG. 6A and conversion filter of b3*(3/5)+b5*(2/5) is used, so that a3 and a4 of pixel arrangement have influence at ratio of 3/5 and a5 and a6 have influence at ratio of 2/5. When calculation expressions of scanning line conversion filters in (p) of FIG. 6A are observed, conversion filter used in e3 corresponding to vertical phase of +3/8 from before scanning line conversion and conversion filter used in e6 corresponding to vertical phase of −3/8 from before scanning line conversion have coefficients of (3/5) and (2/5) which are symmetrical in up and down directions, so that both of them are filters having the same frequency characteristic. Similarly, conversion filter used in e4 corresponding to vertical phase of +1/8 from before scanning line conversion and conversion filter used in e5 corresponding to vertical phase of −1/8 from before scanning line conversion have coefficients of (4/5) and (1/5) which are symmetrical in up and down directions, so that both of them are filters having the same frequency characteristic. That is, 4 vertical phases can be formed by only filters having two kinds of frequency characteristics. In (e) of FIG. 6A, filters having different characteristics are changed over for each scanning line and accordingly when frequency characteristics of filters are not matched at maximum, moiré is produced in image output. In the present method, attention is paid to symmetry of vertical phase in order to reduce kinds of conversion filters and frequency characteristics different in kinds of conversion filters are approximated each other at maximum to thereby reduce moiré in each line. The approximation of frequency characteristics is described later in relation to e3 and g3 together with description of even field.

(p)' of FIG. 6A shows influence ratios of scanning line conversion filters using 4 to 3 lines from odd fields and correspondence pixels. In order to improve frequency characteristic of scanning line conversion filters, the resolution of coefficients and the number of scanning lines before conversion used in calculation are increased. When the number of scanning lines is increased, coefficient of conversion filter sometimes becomes 0, so that line is not used substantially or coefficient sometimes becomes minus value. In scanning line conversion filters of (p)' of FIG. 6A, there are conversion fitter used in e4 corresponding to vertical phase of +1/8 from before scanning line conversion and conversion filter used in e5 corresponding to vertical phase of −1/8 from before scanning line conversion, which have coefficient equal to 0/16, that is, 0 and are not used substantially. Vertical phases of +1/8 and 1/8 use line close to vertical phase having the center of gravity of +0/8 before scanning line conversion and existing on the center of gravity and 3 lines in up and down directions thereof to perform scanning line conversion and vertical phases of +3/8 and −3/8 use 4 lines consisting of 2 lines in up and down directions to perform scanning line conversion. Scanning line conversion filter of (p) of FIG. 6A and scanning line conversion filter of (p)' of FIG. 6A are simplified for description. Actually, resolution of coefficients is increased and about 6 to 5 scanning lines are used to perform scanning line conversion in order to attain flat frequency characteristic or about 10 scanning lines are used to perform scanning line conversion in order to maintain high frequency. The symmetry of conversion filters about vertical phase is the same as description using (p) of FIG. 6A (m) of FIG. 6B shows vertical phases of scanning line conversion from even field. An example using phases at 4 points as phases of scanning line conversion is shown. When phases are prepared at equal intervals in up and down directions by 1/8 phase from phase of c2+0/8 which is the center of gravity of c2, phases at 8 points are considered, although conversion filters are prepared for phases at 4 points of −3/8, −1/8, +1/8 and +3/8 having odd numerator and phases at 4 other points of −2/8, +0/8, +2/8 and +4/8 are not utilized.)

(m)' of FIG. 6B shows vertical phases of scanning line conversion from even field which is the center of gravity of progressive scanning. As vertical phase which is the center of gravity of progressive scanning, it is shown that +3/8, +1/8, −1/8 and −3/8 appear repeatedly and only 4 points exist.

(q) of FIG. 6B shows influence ratios of scanning line conversion filters using 2 lines from even field and correspondence pixels. g3 corresponds to vertical phase of −1/8 from before scanning line conversion in (m)' of FIG. 6B and conversion filter of c2*(1/5)+c4*(4/5) is used, so that a2 and a3 of pixel arrangement have influence at ratio of 1/5 and a4 and a5 have influence at ratio of 4/5. When calculation expression of scanning line conversion filter from even field of (q) of FIG. 6B is compared with calculation expression of scanning line conversion filter from odd field of (p) of FIG. 6A, utilization order is different, although conversion filters for −1/8, −3/8, +3/8 and +1/8 of vertical phases before scanning line conversion have the very same configuration and are shown to be able to be shared with filters of 4 phases of 2 kinds in odd field.

(q)' of FIG. 6B shows influence ratios of scanning line conversion filters using 4 to 3 lines from odd field and correspondence pixels. When calculation expression of scanning line conversion filter from even field of (q)' of FIG. 6B is compared with calculation expression of scanning line conversion filter from odd field of (p)' of FIG. 6A, utilization order is different, although conversion filters for −1/8, −3/8, +3/8 and +1/8 of vertical phase before scanning line conversion have the very same configuration and are shown to be able to be shared with filters of 4 phases of 2 kinds in odd field.

e3 of scanning lines of progressive scan image converted from interlaced scanning of odd field of (e) of FIG. 6A is the same scanning line as g3 of scanning lines of progressive scan image converted from interlaced scanning of odd field of (g) of FIG. 6B and e3 and g3 appear alternately on progressive scanning side every field on interlaced scanning side.

Correspondence pixel of scanning line conversion filter from odd field of (p) of FIG. 6A uses a3 to a6 centering on a4 and a5 for e3, although correspondence pixel of scanning line conversion filter from even field of (q) of FIG. 6B uses a2 and a3 on upper side notwithstanding that ratio of a4 and a5 to g3 is large, so that there is no spread on lower side. Accordingly, upper and lower jitters exist in scanning line conversion filter from odd field of (p) of FIG. 6A and scanning line conversion filter from even field of (q) of FIG. 6B and flicker remains in progressive scan image.

Correspondence pixel of scanning line conversion filter from odd field of (p)' of FIG. 6A uses a1 to a8 centering on a4 and a5 for e3 and correspondence pixel of scanning line conversion filter from even field of (q)' of FIG. 6B uses a2 to a7 centering on a4 and a5 for g3, so that there is difference in the foot spreading up and down but form of utilization range is approximated more closely. Accordingly, in scanning line conversion filter from odd field of (p)' of FIG. 6A and scanning line conversion filter from even field of (q)' of FIG. 6B, flicker in progressive scan image is reduced. To make pixel arrangement utilized in plural scanning line conversion filters approximate form of combination ratio can be also called to approximate frequency characteristic.

In the present method, attention is paid to symmetry of vertical phases and community or commonness of conversion filters utilizable in each field, so that kinds of conversion filters are reduced and frequency characteristics different in kinds of conversion filters are approximated at maximum to thereby reduce moiré in each line and reduce flicker in progressive scan image in each field of interlaced scanning.

When 8 conversion phases are prepared due to different reason even if 4 conversion filters are utilized at the same time, the present method attaches the great importance to symmetry and approximation of frequency characteristics and accordingly phase divided by 16 is supposed to use phase having odd numerator in order to match 8 frequency characteristics. This reason is that vertical phase of +8/16 having bad frequency characteristic and to ought to be avoided extremely and vertical phase of +0/16 which ought to be avoided if possible since frequency characteristic is good for simultaneous use with another phase are removed.

Further, the case where phase of conversion filter utilized simultaneously according to integer ratio of scanning line conversion is even in number is supposed, although since the present method attaches the great importance to symmetry and approximation of frequency characteristics, odd points containing vertical phase of +0 are used and symmetry is provided in up and down directions of vertical phases of +0, and vertical phase of +1/2 having bad frequency characteristic and to ought to be avoided extremely is removed.

Figure 7A:
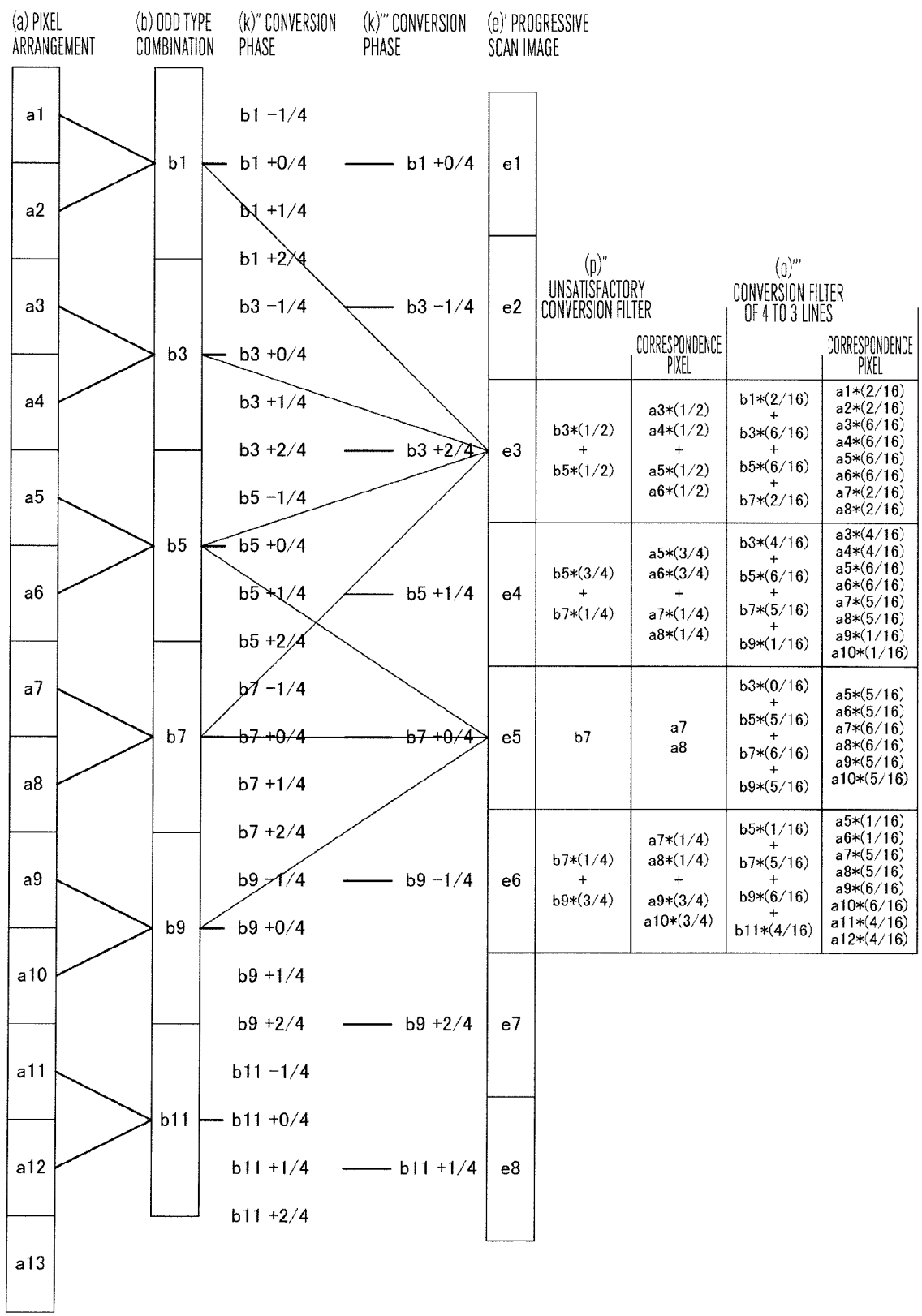
FIG. 7A is a schematic diagram showing scanning line addition operation of odd field of the imaging apparatus according to another embodiment of the present invention.
Figure 7B:
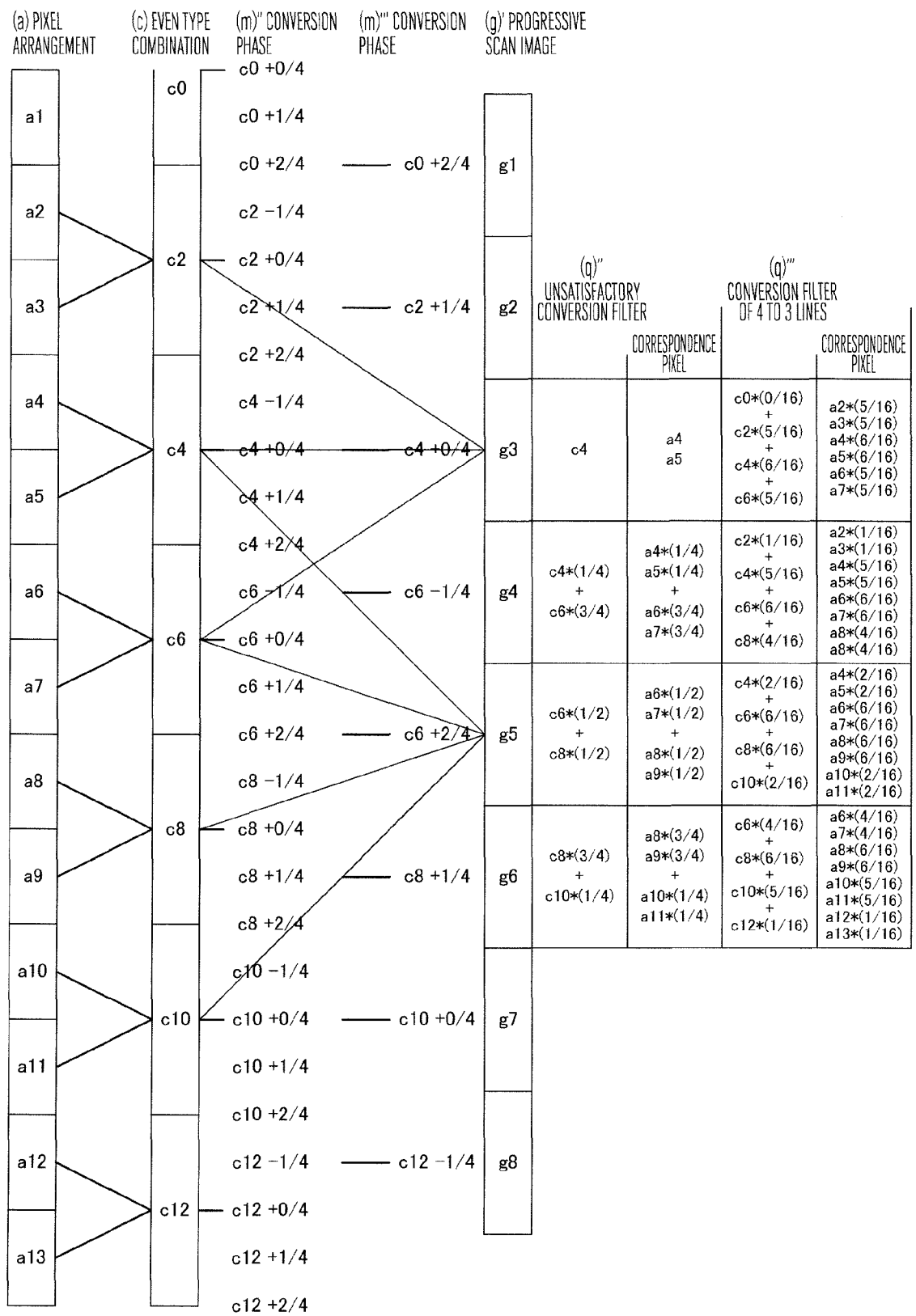
FIG. 7B is a schematic diagram showing scanning line addition operation of even field of the imaging apparatus according to another embodiment of the present invention.

FIGS. 7A and 7B are schematic diagrams showing vertical phase relation in vertical pixel addition operation of the imaging apparatus of the embodiment of the present invention. (a) of FIGS. 7A and 7B shows pixel arrangement of the imaging devices, which corresponds to (a) of FIGS. 6A, 6B and 4A.

(b) of FIG. 7A shows scanning lines of odd field in interlaced scanning, which corresponds to (b) of FIGS. 6A and 4A. Since n-th odd line is added to or combined with n+1st line, b3 is obtained by combining a3 and a4, for example, and vertical phase relation is described identically.

(c) of FIG. 7B shows scanning lines of even field in interlaced scanning, which corresponds to (c) of FIGS. 6B and 4A. Since n-th even line is added to or combined with n+1st line, c4 is obtained by combining a4 and a5, for example, and vertical phase relation is described identically in vertical direction in FIG. 7A.

(e)' of FIG. 7A shows scanning lines of progressive scan image converted from interlaced scanning of odd field and shows vertical phase relation that the center of gravity of vertical phase b1 is equal to the center of gravity of vertical phase of e1, (g)' of FIG. 7B shows scanning lines of progressive scan image converted from interlaced scanning of odd field. Both of them correspond to (e) of FIG. 4B and (g) of FIG. 4C, respectively. In the progressive scan images, (e)' of FIG. 7A and (g)' of FIG. 7B appear alternately and repeatedly every field of interlaced scan image before scanning line conversion and accordingly the vertical phase relation between e1 and g1 concerned with a1 in vertical direction in FIGS. 6A and 6B is described identically.

(k)" of FIG. 7A shows vertical phases of scanning line conversion from odd field. An example using phases at 4 points as phases of scanning line conversion is shown and conversion filters are provided for −1/4, +0/4, +1/4 and +2/4 which are phases shifted by 1/4 phase at equal intervals in up and down directions from phase of b1+0/4 which is the center of gravity of b1.

Phase of +2/4, that is, phase of 1/2 centered from the center of gravity of 2 lines is contained in phase utilized.

(k)" of FIG. 7A shows vertical phase of scanning line conversion from odd field which is the center of gravity of progressive scanning. +0/4, −1/4, +2/4 and +1/4 appear repeatedly in vertical phase which is the center of gravity of progressive scanning and it is shown that only 4 points exist.

(p)" of FIG. 7A shows influence ratios of unsatisfactory scanning line conversion filters using 2 lines from odd field and correspondence pixels. e3 corresponds to vertical phase of +2/4 from before scanning line conversion in (k)''' of FIG. 7A, The vertical phase uses conversion filter of b3*(1/2)+b5*+(1/2) to have influence at averaged ratio of a3, a4, a5 and a6 of pixel arrangement and is vertical phase having worst frequency characteristic in which even if b3 and b5 are white and black, they are treated as only averaged gray. e5 corresponds to vertical phase of +0/4 from before scanning line conversion, that is, phase having the center of gravity equal before and after scanning line conversion and when only 2 lines are used to construct conversion filter, b7 occupies all of ratios to have influence and vertical phase has the best frequency characteristic in which if h7 is white, it is white and if it is black, it is black, although there is large difference from 3 other points. When calculation expression of scanning line conversion filter of (p)" of FIG. 7A is observed, there is no symmetry with conversion filter used in e3 corresponding to vertical phase of +2/4 before scanning line conversion, that is, phase of 1/2 which is the middle point from the center of gravity of 2 lines and it is the only singular point. Similarly, there is no symmetry with conversion filter used in e5 corresponding to vertical phase of +0/4 before scanning line conversion, that is, phase having the center of gravity equal after and before scanning line conversion and it is the only singular point. Conversion filter used in e4 corresponding to vertical phase of +1/4 before scanning line conversion and conversion filter used in e6 corresponding to vertical phase of −1/4 before scanning line conversion have coefficients of (3/4) and (1/4) which are symmetrical in up and down directions and have the same frequency characteristic. 4 vertical phases are formed by filters having 3 kinds of frequency characteristics and community or commonness and symmetry are lacking as compared with the case of FIG. 6.

In (e)' of FIG. 7A, filters having different characteristics are changed over every scanning line and accordingly if frequency characteristics of filters are not set to be made equal at maximum, moiré is produced in image output. In the embodiment, frequency characteristics different in kinds of conversion filters are approximated at maximum, so that moiré in each line is reduced. Accordingly, (p)" of FIG. 7A ought not to be adopted as unsatisfactory conversion filter. Approximation of frequency characteristics is described later in relation to e3 and g3 together with description of even field.

(p)''' of FIG. 7A shows influence ratios of scanning line conversion filters using 4 to 3 lines from odd field and correspondence pixels. In order to improve frequency characteristic of scanning line conversion filter, the number of scanning lines before conversion used in calculation and resolution of coefficient are increased. When the number of lines is increased, there sometimes exists coefficient of conversion filter which is equal to 0 meaning substantially unusable line and has negative value. In scanning line conversion filters of (p)''' of FIG. 7A, conversion filter used in e5 corresponding to vertical phase of +0/4 having the center of gravity equal before scanning line conversion contains line having coefficient of 0/16, that is, 0 meaning substantially unusable line. Only vertical phase of +0/4 of the center of gravity before scanning line conversion performs scanning line conversion using line positioned in the center of gravity and 3 upper and lower lines and 3 other vertical phases perform scanning line conversion using 4 lines consisting of 2 lines in up and down directions.

The fact that vertical phase of +2/4 and vertical phase of +0/4 are the only singular points and vertical phase of −1/4 and vertical phase of +1/4 are symmetrical in upper and lower directions and form conversion filters of 3 kinds are the same as (p)" of FIG. 7A.

In order to approximate frequency characteristics, since the worst vertical phase of +2/4 exists, the vertical phase of +0/4 is required to suppress the original best frequency characteristic and to be such conversion filter as to average 3 lines and characteristic of phase is not utilized effectively.

Scanning line conversion filter of (p)" of FIG. 7A and scanning line conversion filter of (p)" of FIG. 7A are simplified for description.

(m)" of FIG. 7B shows vertical phase of scanning line conversion from even field. An example using phases at 4 points as phase of scanning line conversion is shown. Conversion filters for −1/4, +0/4, +1/4 and +2/4 which are phases taken at equal intervals in up and down directions by 1/4 phase from phase of c2+0/4 which is the center of gravity of c2 are prepared.

(m)" of FIG. 7B shows vertical phases of scanning line conversion from even field which is the center of gravity of progressive scanning. +2/4, +1/4, +0/4 and −1/4 appear repeatedly in vertical phase which is the center of gravity of progressive scanning and it is shown that only 4 points exist.

(q)" of FIG. 7B shows influence ratios of unsatisfactory scanning line filters using 2 lines from even field and correspondence pixels. g3 corresponds to vertical phase of +0/4 from before scanning line conversion in (m)" of FIG. 7B, that is, phase having the center of gravity equal before and after scanning line conversion and when only 2 lines are used to construct conversion filter, c4 occupies all of ratios to have influence and vertical phase has the best frequency characteristic in which if e4 is white, it is white and if it is black, it is black, although there is large difference from 3 other points. g5 corresponds to vertical phase of +2/4 from before scanning line conversion in (m)" of FIG. 7B. The vertical phase uses conversion filter of c6*(1/2)+c8*(1/2) to have influence at averaged ratio of a6, a7, a8 and a9 of pixel arrangement and is vertical phase having worst frequency characteristic in which even if c6 and c8 are white and black, they are treated as only averaged gray.

When calculation expression of scanning line conversion filter from even field of (q)" of FIG. 7B is compared with calculation expression of scanning line conversion filter from odd field of (p)" of FIG. 7A, utilization order is different, although conversion filters for +0/4, −1/4, +2/4 and +1/4 of vertical phase before scanning line conversion have the very same configuration and are shown to be able to be shared with filters of 4 phases of 3 kinds in odd field.

(q)''' of FIG. 7B shows influence ratios of scanning line conversion filters using 4 to 3 lines from even field and correspondence pixels. When calculation expression of scanning line conversion filter from even field of (q)''' of FIG. 7B is compared with calculation expression of scanning line conversion filter from odd field of (p)''' of FIG. 7A, utilization order is different, although conversion filters for +0/4, −1/4, +2/4 and +1/4 of vertical phase before scanning line conversion have the very same configuration and are shown to be able to be shared with filters of 4 phases of 3 kinds in odd field.

e3 in scanning lines of progressive scan image converted from interlaced scanning of odd field of (e)' of FIG. 7A is the same scanning line as g3 of scanning lines of progressive scan image converted from interlaced scanning of even field of (g)' of FIG. 7B and e3 and g3 appear alternately on progressive scanning side every field on interlaced scanning side. In unsatisfactory scanning line conversion filters of (p)" of FIG. 7A and (q)" of FIG. 7B, e3 has the worst frequency characteristic in averaged value of 2 scanning line before conversion, whereas g3 is equal to scanning line before conversion and has the best frequency characteristic. e3 and g3 appear alternately, so that strong flicker is produced in progressive scan image. Similarly, strong flicker is produced even in e5 and g5, so that strong moiré occurs in e3, e5, g3 and g5. Even in this embodiment, frequency characteristics of scanning line conversion filters formed by plural kinds can be matched to reduce moiré and flicker. The scanning line conversion filter is composed of 3 kinds of conversion filters including conversion filter of vertical phase of +0/4 from scanning line before conversion, symmetrical conversion filter shared by vertical phase of −1/4 and vertical phase of +1/4 and conversion filter of vertical phase of +2/4. In order to reduce flicker, scanning line conversion filter of 4 to 3 lines of (p)''' of FIG. 7A and scanning line conversion filter of 4 to 3 lines of (q)''' of FIG. 7B are used, for example. In order to match frequency characteristics of conversion filters of 3 kinds, combination ratio of other conversion filters is merely approximated to the worst characteristic of 1/2 phase and the best vertical phase having the equal center of gravity is approximated to be average of 2 lines, so that characteristic cannot be utilized effectively. In (p)''' of FIG. 7A, e3 is conversion filter of vertical phase of +2/4, in which the foot of average of 2 lines is spread up and down and a3 to a6 are centered to be a1 to a8. In (q)''' of FIG. 7B, g3 is conversion filter of vertical phase of +0/4, which is extended to a2 to a7 near to average of 3 lines, so that form of filter is approximated.

Even if the method of FIGS. 6A and 6B cannot be used due to any reason, different frequency characteristics can be approximated at maximum by kinds of conversion filters as in the embodiment to reduce moiré in each line and reduce flicker in progressive scan image in each field of interlaced scanning.

Operation of the imaging apparatus using three IT-CCD's of 4 phases and color separation optical system has been described in detail.

However, vertical transfer addition operations of V1-V4 of IT-CCD and V1A-V4A of FIT-CCD, vertical transfer operations for each set at horizontal period of V1-V4 of IT-CCD and V1B-V4B of FIT-CCD and horizontal transfer operations of H1-H2 of IT-CCD and H1-H2 of FIT-CCD are the same. High-speed transfers during vertical retrace period of V1A-V4A and V1B-V4B of FIT-CCD are different. That is, operation of the present invention can be applied to not only IT-CCD but also FIT-CCD.

Further, the present invention can be applied to not only CCD of 4 phases of vertical transfer but also CCD of 6 and 8 phases of vertical transfer. Moreover, the present invention can be also applied to CCD with single on-chip color film and single CCD for black-and-white imaging.

It should be further understood by those skilled in the art that although the foregoing description has been made on embodiments of this invention, the invention is not limited thereto and various changes and modifications may be made without departing from the spirit of the invention and the scope of the appended claims.

The invention claimed is:

1. A driving method of an imaging apparatus, wherein the imaging apparatus subjects signal electric charges of an (IT-CCD Interline Transfer Charge-Coupled Device) or a FIT-CCD (Frame Interline Transfer Charge-Coupled Device) for interlaced scanning to vertical pixel addition to be read out as image signals, the driving method comprising:
- fixing pairs of vertical pixels subjected to vertical pixel addition to odd and even fields to be read out as image signals of interlaced scanning from the IT-CCD or the FIT-CCD;
- reducing singular points in accordance with correlation of arrangement phases of scanning lines of image signals of the interlaced scanning and arrangement phases of scanning lines of image signals of second progressive scanning;
- subjecting image signals to scanning line conversion by additional average of scanning lines of several kinds of coefficients having vertical frequency characteristics approximating to one another to be converted into image signals of second progressive scanning; and
- outputting image signals of second progressive scanning.

2. The driving method according to claim 1, further comprising:
- subjecting the read-out image signals to scanning line conversion by additional average of a plurality of scanning lines of the read-out image signals of first progressive scanning to output image signals of second progressive scanning.

3. The driving method of according to claim 1, wherein the reading-out from the IT-CCD or the FIT-CCD comprises performing vertical pixel addition to be read out as image signals of third progressive scanning from the IT-CCD or the FIT-CCD, subjecting the read-out image signals of third progressive scanning to scanning line conversion by additional average of 3 or more scanning lines in natural number to be converted into image signals of second progressive scanning, and outputting image signals of second progressive scanning.

4. A driving method of an imaging apparatus, wherein the imaging apparatus subjects signal electric charges of an (IT-CCD Interline Transfer Charge-Coupled Device) for interlaced scanning of 1080 effective scanning lines to vertical pixel addition to be read out as image signals, the driving method comprising:
- fixing pairs of vertical pixels subjected to vertical pixel addition;
- stopping transfer at half of horizontal period of the last of field;
- reading out as image signals 540 effective scanning lines of progressive scanning from the IT-CCD;
- performing scanning line conversion of the read out image signals of 540 effective scanning lines into image signals of 720 effective scanning lines of progressive scanning; and
- outputting the image signals of progressive scanning of 720 effective scanning lines.

5. The driving method according to claim 4, further comprising:
- stopping at least one of vertical transfer at half of horizontal period of the last of field, horizontal transfer at half of horizontal period of the last of field, and clamping of horizontal optical black pixels of at least one time.

6. The driving method according to claim 4, wherein only vertical optical black pixels are clamped except half period of horizontal period of the last of field.

* * * * *